(12) United States Patent
Kang

(10) Patent No.: US 12,542,515 B2
(45) Date of Patent: Feb. 3, 2026

(54) PHOTOVOLTAIC SYSTEM, DEVICE AND METHOD FOR MONITORING THEREOF

(71) Applicant: HANWHA SOLUTIONS CORPORATION, Seoul (KR)

(72) Inventor: Ju Wan Kang, Seoul (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 0 days.

(21) Appl. No.: 17/529,054

(22) Filed: Nov. 17, 2021

(65) Prior Publication Data

US 2022/0286084 A1 Sep. 8, 2022

(30) Foreign Application Priority Data

Sep. 18, 2020 (KR) .................. 10-2020-0120735

(51) Int. Cl.
*H02S 50/10* (2014.01)
*H02J 13/00* (2006.01)
*H02S 40/34* (2014.01)

(52) U.S. Cl.
CPC ........ *H02S 50/10* (2014.12); *H02J 13/00007* (2020.01); *H02S 40/34* (2014.12)

(58) Field of Classification Search
CPC ............................ H02S 50/10; H02J 13/00007
See application file for complete search history.

(56) References Cited

U.S. PATENT DOCUMENTS

| | | | |
|---|---|---|---|
| 8,050,804 B2 * | 11/2011 | Kernahan | H01L 31/02021 700/297 |
| 8,344,549 B2 | 1/2013 | Loh et al. | |
| 9,520,803 B2 | 12/2016 | Garrity et al. | |
| 2008/0097655 A1 * | 4/2008 | Hadar | H02J 13/00007 700/286 |
| 2009/0000659 A1 * | 1/2009 | Hasegawa | H02S 50/10 136/252 |
| 2010/0139734 A1 * | 6/2010 | Hadar | H10F 77/63 136/244 |

(Continued)

FOREIGN PATENT DOCUMENTS

| | | |
|---|---|---|
| KR | 10-1183532 B1 | 9/2012 |
| KR | 10-2015-0088132 A | 7/2015 |

(Continued)

OTHER PUBLICATIONS

S. Ayesh, et al. "Design of wireless sensor network for monitoring the performance of photovoltaic panel," 2017 Trends in Industrial Measurement and Automation (TIMA), Chennai, India, 2017, pp. 1-6 (Year: 2017).*

(Continued)

*Primary Examiner* — Sadie White
(74) *Attorney, Agent, or Firm* — Sughrue Mion, PLLC

(57) ABSTRACT

A photovoltaic system includes: a plurality of solar cell modules each including a plurality of solar cells, at least one monitoring device configured to measure a module voltage of a corresponding solar cell module from among the plurality of solar cell modules, and a current measuring device that receives the measured module voltage from the at least one monitoring device and is connected to the plurality of solar cell modules through a power line to measure a module current of the plurality of solar cell modules.

15 Claims, 14 Drawing Sheets

(56) References Cited

U.S. PATENT DOCUMENTS

| | | | | |
|---|---|---|---|---|
| 2010/0300509 | A1* | 12/2010 | Raymond | H04Q 9/00 136/244 |
| 2011/0032099 | A1* | 2/2011 | Giesler | G08B 13/1409 340/568.1 |
| 2012/0053867 | A1* | 3/2012 | Dunn | H02S 50/10 702/58 |
| 2012/0133208 | A1* | 5/2012 | Kalhoff | G01D 21/00 307/71 |
| 2012/0262949 | A1* | 10/2012 | Han | H02J 3/381 363/16 |
| 2012/0299576 | A1* | 11/2012 | Kasai | H02S 40/34 324/76.11 |
| 2012/0316802 | A1* | 12/2012 | Presher, Jr. | H02J 3/381 702/58 |
| 2013/0009483 | A1* | 1/2013 | Kawate | H02J 1/10 307/77 |
| 2013/0307556 | A1* | 11/2013 | Ledenev | H02S 50/10 324/509 |
| 2014/0265638 | A1* | 9/2014 | Orr | H01H 9/00 307/131 |
| 2015/0222227 | A1* | 8/2015 | Nishizawa | H02S 50/00 324/761.01 |
| 2015/0381108 | A1* | 12/2015 | Höft | H02S 50/00 361/91.1 |
| 2016/0233830 | A1 | 8/2016 | Kouno et al. | |
| 2017/0244358 | A1 | 8/2017 | Moslehi | |
| 2018/0041040 | A1* | 2/2018 | Jung | H02S 50/00 |
| 2018/0097354 | A1* | 4/2018 | Yoscovich | H02S 50/00 |
| 2018/0159466 | A1* | 6/2018 | Ringer | H02S 40/32 |
| 2018/0191292 | A1 | 7/2018 | Ehlmann | |
| 2019/0006987 | A1 | 1/2019 | Fang et al. | |
| 2020/0006936 | A1* | 1/2020 | Zhu | H02S 50/10 |

FOREIGN PATENT DOCUMENTS

| | | |
|---|---|---|
| KR | 10-1817340 B1 | 1/2018 |
| KR | 10-2018-0016856 A | 2/2018 |
| KR | 10-1920739 B1 | 11/2018 |
| KR | 10-2019-0125149 A | 11/2019 |

OTHER PUBLICATIONS

Australian Office Action dated Dec. 2, 2022 in Australian Application No. 2022200175.

Office Action dated May 11, 2023 from the Australian Patent Office in Application No. 2022200175.

* cited by examiner

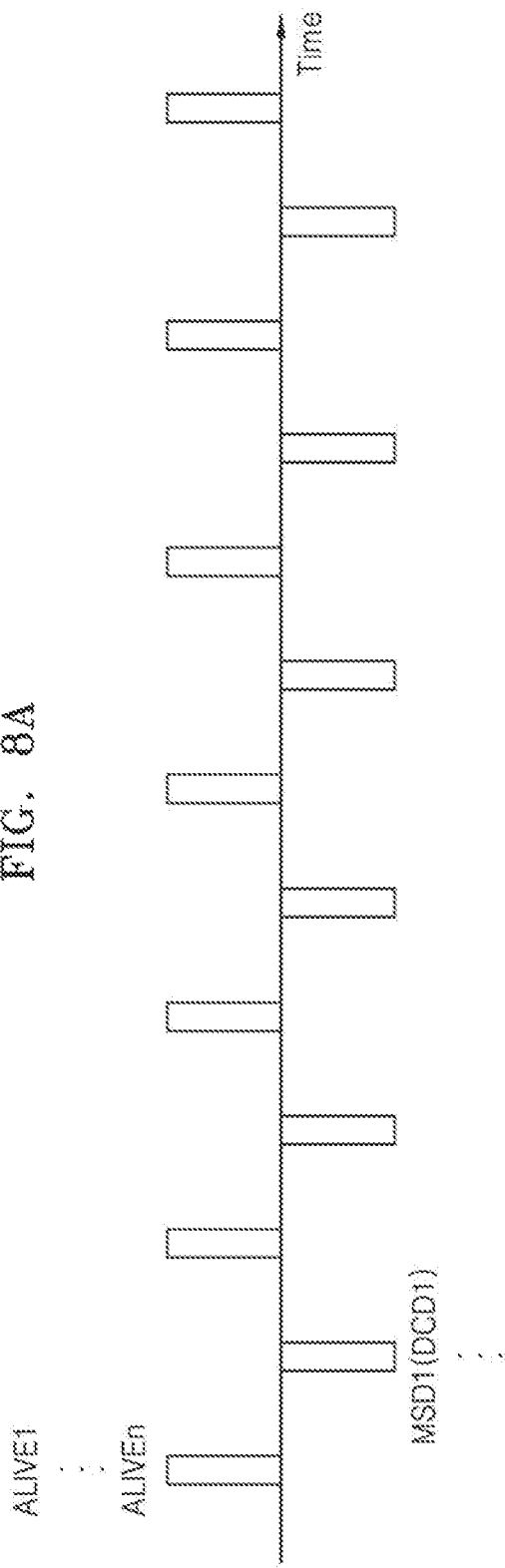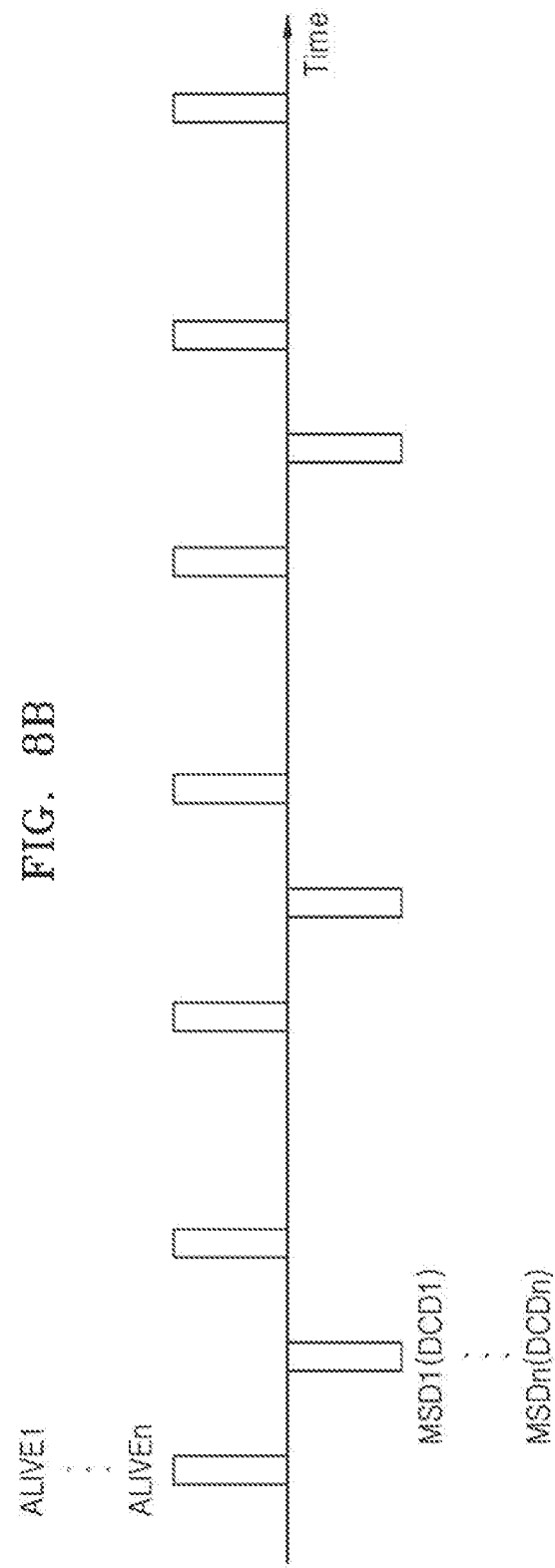

PHOTOVOLTAIC SYSTEM, DEVICE AND METHOD FOR MONITORING THEREOF

CROSS-REFERENCE TO RELATED APPLICATION

This application claims the benefit of Korean Patent Application No. 10-2020-0120735, filed on Sep. 18, 2020, in the Korean Intellectual Property Office, the disclosure of which is incorporated herein in its entirety by reference.

BACKGROUND

1. Field

The present disclosure relates to a photovoltaic system, and a monitoring device and a monitoring method thereof.

2. Description of the Related Art

A photovoltaic system may measure a voltage and a current based on data for monitoring the amount of power generated by each of solar cell modules or the total amount of power generated, and may periodically or continuously provide the voltage and current to an external server or terminal.

The conventional photovoltaic system is implemented such that each of the solar cell modules measures a voltage and a current, and transmits the measured voltage and current to an inverter or a gateway, respectively. Because each of the solar cell modules needs to include components for measuring a voltage and measuring a current, the structure of the solar cell module may be complicated and cost may increase.

In addition, as the number of solar cell modules included in a photovoltaic system increases, the amount of data transmitted/received between solar cell modules and a gateway (or inverter) also increases, which may cause problems such as lowering of data reception and management efficiency of a gateway, etc. or lowering of a data transmission rate due to communication interference.

As an area in which the photovoltaic system is installed increases, a distance between the solar cell modules and the gateway (or inverter) may increase. In this case, a transmission rate of data transmitted from the solar cell modules to the gateway or the like may decrease, and power required for data transmission may increase.

SUMMARY

Provided are photovoltaic systems, monitoring devices, and monitoring methods capable of more efficiently measuring data (such as module voltage and module current) for calculating the amount of power generated by solar cell modules.

Provided are photovoltaic systems, monitoring devices, and monitoring methods capable of efficiently transmitting and processing data related to the calculation of the amount of power generated by solar cell modules.

Additional aspects will be set forth in part in the description which follows and, in part, will be apparent from the description, or may be learned by practice of the presented embodiments.

According to an aspect of an embodiment, a photovoltaic system comprises: a plurality of solar cell modules each including a plurality of solar cells, at least one monitoring device configured to measure a module voltage of a corresponding solar cell module from among the plurality of solar cell modules, and a current measuring device that receives the measured module voltage from the at least one monitoring device and is connected to the plurality of solar cell modules through a power line to measure a module current of the plurality of solar cell modules.

According to an exemplary embodiment, the plurality of solar cell modules are divided into at least one module string, solar cell modules included in the same module string are connected in series to the current measuring device, and the current measuring device measures the module current by measuring a current of the at least one module string.

According to an exemplary embodiment, the at least one monitoring device comprises: a voltage measuring device configured to measure the module voltage of the corresponding solar cell module, and a power line communication interface configured to transmit module data including the measured module voltage to the current measuring device or another monitoring device through a power line.

According to an exemplary embodiment, the current measuring device comprises: a communication device that receives, from the at least one module string, module string data including at least one module data and power, and separates the received module string data and the power; and a current measuring device configured to measure a current of a corresponding module string based on the separated power.

According to an exemplary embodiment, the current measuring device transmits a signal to the at least one module string, the at least one monitoring device, in response to the signal, transmits the module data to the current measuring device or another monitoring device, and the current measuring device receives, from the at least one module string, module string data including at least one module data.

According to an exemplary embodiment, the at least one module string includes a plurality of module strings, the current measuring device transmits a signal to each of the plurality of module strings simultaneously, and at least some of reception times of respective pieces of module string data of the plurality of module strings overlap.

According to an exemplary embodiment, the current measuring device receives respective pieces of module string data of the plurality of module strings at different times.

According to an exemplary embodiment, the at least one monitoring device is included in a junction box of a corresponding solar cell module.

According to an exemplary embodiment, the plurality of solar cell modules comprise at least one DC/DC converter included in a junction box and connected to the plurality of solar cells in a cell string unit, wherein the cell string includes at least some of solar cells continuously connected to each other from among the plurality of solar cells.

According to an exemplary embodiment, the at least one monitoring device comprises the at least one DC/DC converter, and the at least one DC/DC converter comprises a power line communication interface configured to transmit converter data including a converted voltage to the current measuring device.

According to an exemplary embodiment, the photovoltaic system further comprising: at least one string gateway connected to the at least one module string; and a main gateway connected to the at least one string gateway. The current measuring device measures a current of the at least one module string based on power received from the at least one string gateway, and the module current of the plurality of solar cell modules is a current measured for a corresponding module string.

According to an exemplary embodiment, the at least one string gateway includes a plurality of string gateways, the plurality of string gateways are connected to each other in a cascade structure, the main gateway is connected to any one of the plurality of string gateways to receive module string data of each of the plurality of module strings, and the module string data includes a module voltage of at least one solar cell module included in a corresponding module.

According to an aspect of another embodiment, a method of monitoring a photovoltaic system comprises: measuring a module voltage of a plurality of solar cell modules; transmitting power generated from the plurality of solar cell modules and module data including the measured module voltage to a current measuring device; and measuring, by the current measuring device, a module current of the plurality of solar cell modules based on the received power.

According to an exemplary embodiment, the measuring of the module voltage comprises measuring, by a monitoring device corresponding to the plurality of solar cell modules, the module voltage using a voltage measuring device, and the transmitting comprises transmitting, by the monitoring device, the module data including the measured module voltage to the current measuring device through power line communication.

According to an exemplary embodiment, the plurality of solar cell modules are divided into at least one module string, at least one solar cell module included in each of the at least one module string is connected in series to the current measuring device, and the measuring of the module current comprises measuring, by the current measuring device, the module current of the plurality of solar cell modules by measuring a current of the at least one module string.

According to an exemplary embodiment, the measuring of the module current comprises: receiving module string data including at least one module data and power from the at least one module string through the power line; separating the power and the module string data received through the power line; and measuring a current of a corresponding module string based on the separated power.

According to an aspect of another embodiment, a monitoring device for a photovoltaic system comprises: a voltage measuring device connected to both ends of a plurality of solar cells included in a solar cell module to measure a module voltage of the solar cell module; and a communication interface configured to transmit module data including the measured module voltage to a current measuring device connected to the solar cell module.

According to an exemplary embodiment, the communication interface comprises: a power line communication interface connected to a power line between the solar cell module and the current measuring device, and transmitting the module data to the current measuring device or another monitoring device through power line communication.

BRIEF DESCRIPTION OF THE DRAWINGS

These and/or other aspects will become apparent and more readily appreciated from the following description of the embodiments, taken in conjunction with the accompanying drawings in which:

FIGS. 8A-8B to FIGS. 10A-10B are timing diagrams illustrating embodiments in which module string data or DC-DC converter data is transmitted from solar cell modules to a current measuring device.

DETAILED DESCRIPTION

Figure 1:
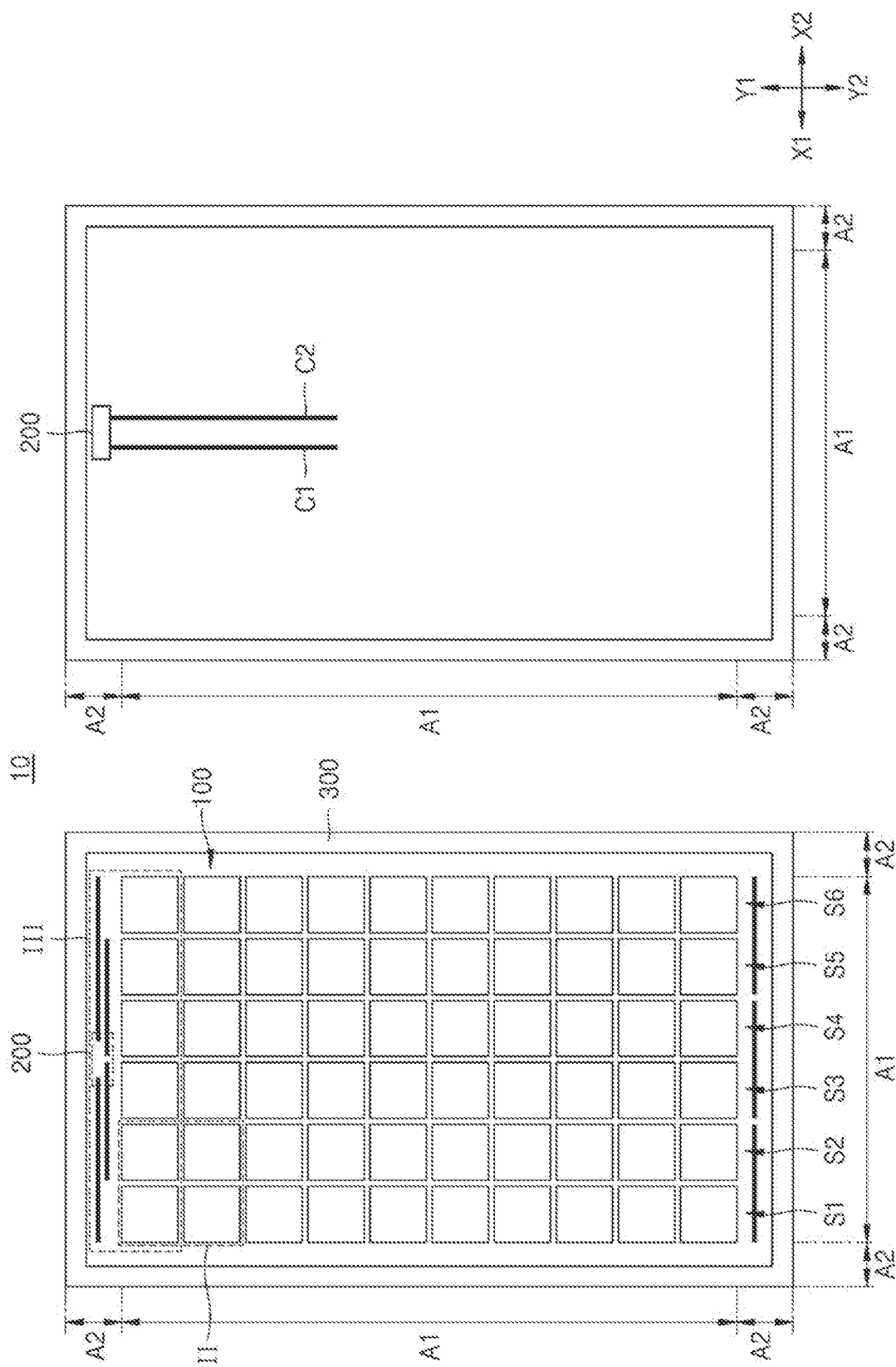
FIG. 1 is a view of a front surface and a rear surface of a solar cell module according to an embodiment.

Embodiments according to the inventive concept are provided to more completely explain the inventive concept to one of ordinary skill in the art, and the following embodiments may be modified in various other forms and the scope of the inventive concept is not limited to the following embodiments. Rather, these embodiments are provided so that the disclosure will be thorough and complete, and will fully convey the scope of the inventive concept to one of ordinary skill in the art.

It will be understood that, although the terms first, second, etc. may be used herein to describe various members, regions, layers, sections, and/or components, these members, regions, layers, sections, and/or components should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which the inventive concept belongs embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

In the drawings, variations from the illustrated shapes may be expected because of, for example, manufacturing techniques and/or tolerances. Thus, embodiments of the inventive concept should not be construed as being limited to the particular shapes of regions illustrated herein but may include deviations in shapes that result, for example, from manufacturing processes. Like reference numerals in the drawings denote like elements, and thus their overlapped explanations are omitted.

As used herein, the term "and/or" includes any and all combinations of one or more of the associated listed items.

Hereinafter, embodiments of the inventive concept will be described in detail with reference to the accompanying drawings.

Figure 2:
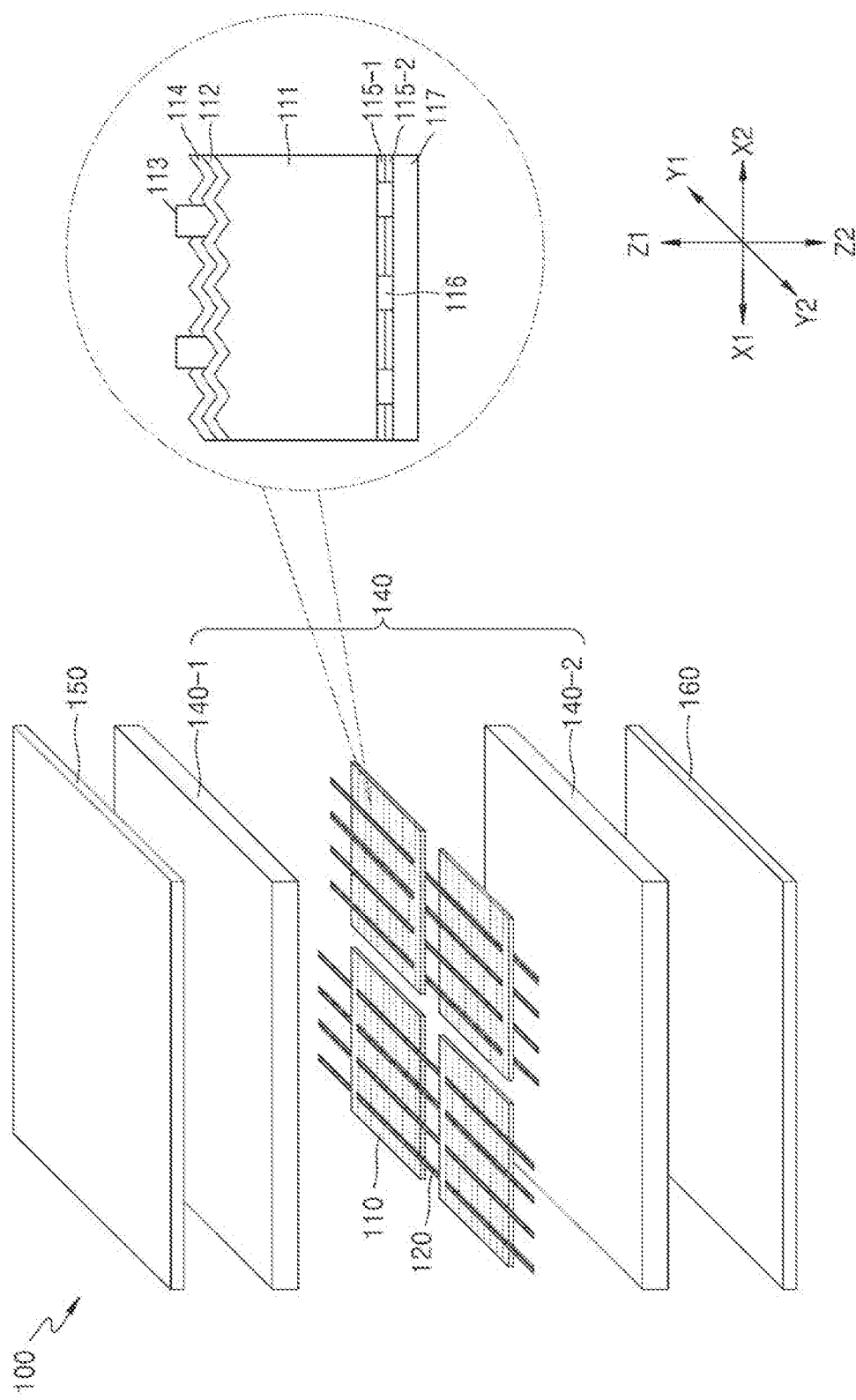
FIG. 2 is an enlarged view of area II of FIG. 1, and is an exploded perspective view of a main portion of the solar cell module shown in FIG. 1.

FIG. 1 is a view of a front surface and a rear surface of a solar cell module according to an embodiment. FIG. 2 is an enlarged view of area II of FIG. 1, and is an exploded perspective view of a main portion of the solar cell module shown in FIG. 1.

Referring to FIGS. 1 and 2, a solar cell module 10 according to an embodiment may include a solar cell panel 100, a junction box 200 collecting power generated from solar cells 110 of the solar cell panel 100, and a frame 300 accommodating the solar cell panel 100.

The solar cell panel 100 may include the plurality of solar cells 110, a first connecting member 120 electrically connecting the solar cells 110, and an upper protective film 140-1 and a lower protective film 140-2 that protect the solar cells 110. In addition, the solar cell panel 100 may include a transparent member 150 located on an upper surface of the solar cells 110, for example, on the upper protective film 140-1 on a light-receiving surface side, and a back sheet 160 located on a lower surface of the solar cells 110, for example, on a lower surface of the lower protective film 140-2 opposite to the light-receiving surface.

The back sheet 160 may be a layer for protecting the solar cells 110 from the influence of an external environment. For example, the back sheet 160 may protect the solar cells 110 by blocking moisture from penetrating from a rear surface of the solar cell panel 100.

FIG. 2 illustrates an embodiment in which the back sheet 160 is implemented as a single layer, but is not limited thereto. According to an embodiment, the back sheet 160 may have a multilayer structure such as a layer preventing moisture and oxygen penetration, a layer preventing chemical corrosion, and a layer having insulating properties.

In another embodiment, when the solar cells 110 are bifacial solar cells, the back sheet 160 may be replaced with a transparent member. For example, the back sheet 160 may be replaced with glass. The glass may be a tempered glass having high transmittance and an excellent breakage prevention function, similar to the transparent member 150 to be described later below. As described above, because the transparent member 150 and the rear sheet 160 are made of glass, the solar cell panel 100 may have a glass-to-glass (G2G) structure.

The upper protective film 140-1 and the lower protective film 140-2 may be integrated with the solar cells 110 by a lamination process in a state in which they are respectively arranged above and below the solar cells 110. The upper protective film 140-1 and the lower protective film 140-2 may be layers for preventing corrosion due to moisture penetration and protecting the solar cells 110 from impact. The upper protective film 140-1 and the lower protective film 140-2 may include a material such as ethylene vinyl acetate (EVA). Hereinafter, for convenience of description, the integrated upper protective film 140-1 and the lower protective film 140-2 may be referred to as a protective film 140.

The transparent member 150 located on the protective layer 140 may include tempered glass having high transmittance and an excellent damage prevention function. According to an embodiment, a side surface of the transparent member 150 or a lower surface in contact with the protective film 140 of the transparent member 150 may be embossed to increase a scattering effect of light. On the other hand, according to an embodiment, when the solar cell module 10 is a floating photovoltaic module, the transparent member 150 may be adhered to the protective layer 140 by a material such as polyolefin elastomer, which is a polymer material having excellent moisture resistance.

The solar cells 110 may include a first semiconductor layer 111, a second semiconductor layer 112 on the first semiconductor layer 111, a first electrode 113 on the second semiconductor layer 112, an antireflection layer 114 on the second semiconductor layer 112 where the first electrode 113 is not located, a passivation layer 115-1 and a capping layer 115-2 on the opposite side of a light-receiving surface of the first semiconductor layer 111, a local contact 116 surrounded by a passivation layer 115-1 and a capping layer 115-2, and a second electrode 117 below the capping layer 115-2.

The first semiconductor layer 111 may include a semiconductor material of a first conductivity type. For example, the first semiconductor layer 111 may include silicon doped with p-type impurities. The silicon may be single crystal silicon, polycrystalline silicon, or amorphous silicon.

In another embodiment, the first semiconductor layer 111 may include a semiconductor material of a second conductivity type opposite to the first conductivity type. For example, the first semiconductor layer 111 may include silicon doped with n-type impurities.

In order to form an upper surface of the first semiconductor layer 111 as a textured surface, the first semiconductor layer 111 may be textured. When the surface of the first semiconductor layer 111 is formed as a textured surface, light reflectivity at a light-receiving surface of the first semiconductor layer 111 may decrease and light absorption may increase.

The second semiconductor layer 112 may include a semiconductor material of a second conductivity type opposite to the first conductivity type. For example, the second semiconductor layer 112 may include silicon doped with n-type impurities.

However, in some embodiments, the first semiconductor layer 111 may include the semiconductor material of the second conductivity type, and the second semiconductor layer 112 may include the semiconductor material of the first conductivity type.

A plurality of first electrodes 113 may be located on the second semiconductor layer 112 and may be electrically connected to the second semiconductor layer 112. The plurality of first electrodes 113 may be formed in any one direction while being apart from each other.

The plurality of first electrodes 113 may include at least one conductive material. For example, the conductive material may be at least one of nickel (Ni), copper (Cu), silver (Ag), aluminum (Al), tin (Sn), zinc (Zn), indium (In), titanium (Ti), gold (Au), and combinations thereof. However, the disclosure is not limited thereto, and may include conductive materials other than the conductive materials described above.

The plurality of first electrodes 113 may transfer collected charges to an upper connection portion or pad (not shown) formed on the second semiconductor layer 112 in a direction crossing the plurality of first electrodes 113. The upper connection portion may include at least one conductive material. The upper connection portion may be connected to first connecting members 120 to be described later below, and may output charges transferred from the plurality of first electrodes 113 through the first connecting members 120.

The antireflection layer 114 may be on the second semiconductor layer 112 in an area where the plurality of first electrodes 113 and the upper connection portion are not formed. The antireflection layer 114 may reduce reflectivity of light incident to the solar cells 110 and increase selectivity in a specific wavelength area.

For example, the antireflection layer 114 may include at least one of a silicon nitride layer (SiNx), a silicon oxide layer (SiO2), and a silicon oxynitride layer (SiON).

The passivation layer 115-1, the capping layer 115-2, and a plurality of local contacts 116 surrounded by the passivation layer 115-1 and the capping layer 115-2 may be located below the first semiconductor layer 111.

The passivation layer 115-1 and the capping layer 115-2 may reflect light leaking to the opposite surface of the light-receiving surface, that is, a lower surface of the first semiconductor layer 111 to the first semiconductor layer 111. The reflected light may be absorbed by the first semiconductor layer 111, and accordingly, the efficiency of the solar cells 110 may be increased.

For example, the passivation layer 115-1 may include an aluminum oxide layer (Al2O3), and the capping layer 115-2 may include a silicon nitride layer (SiNx), but are not limited thereto. In another example, the passivation layer 115-1 may include a silicon oxide layer (SiO2), and the capping layer 115-2 may include a silicon oxynitride layer (SiON). In other words, the passivation layer 115-1 and the capping layer 115-2 may include at least one of various dielectric layers.

The plurality of local contacts 116 may reduce the contact resistance between the second electrode 117 therebelow and the first semiconductor layer 111 to increase the efficiency of a solar cell 110. For example, the plurality of local contacts 116 may include a conductive material such as Al. According to an embodiment, the plurality of local contacts 116 may include the same material as that of the second electrode 117.

The second electrode 117 is below the capping layer 115-2 and may collect charges moving toward the first semiconductor layer 111.

The second electrode 117 may include at least one conductive material. The conductive material may be at least one of Ni, Cu, Ag, Al, Sn, Zn, In, Ti, Au, and combinations thereof. However, the disclosure is not limited thereto, and the second electrode 117 may include conductive materials other than the conductive materials described above.

Meanwhile, a plurality of lower connection portions or pads (not shown) formed in a direction parallel to the upper connection portions may be on the same surface as that of the second electrode 117, and charges collected by the second electrode 117 may be transferred to the lower connection portions.

The lower connection portions may also include at least one conductive material. In addition, the lower connection portions may be connected to the first connecting members 120 to be described later below, so that the charges transferred from the second electrode 117 may be output through the first connecting members 120.

In the above, a Passivated Emitter and Rear Cell (PERC) type solar cell has been described as an embodiment of the solar cells 110, but it is to be noted that this is only an example and the inventive concept is not limited thereto.

For example, the solar cells 110 may be Back Surface Field (BSF) type solar cells. In this case, the solar cells 110 may include a BSF layer interposed between the first semiconductor layer 111 and the second electrode 117 and completely covering a rear surface of the first semiconductor layer 111. The BSF layer may be an area doped with impurities of the same conductivity type as that of the first semiconductor layer 111 at a higher concentration than that of the first semiconductor layer 111.

As another example, the solar cells 110 may be Passivated Emitter and Rear Locally diffused (PERL) type solar cells. In this case, the solar cells 110 may include a local BSF layer formed over the plurality of local contacts 116.

As another example, the solar cells 110 may be Passivated Emitter and Rear Totally diffused (PERT) type solar cells. In this case, the solar cells 110, unlike the PERL-type solar cells, may include a BSF layer formed to cover the passivation layer 115-1 while exposing the plurality of local contacts 116 under the first semiconductor layer 111.

As another example, the solar cells 110 may be Tunnel Oxide Passivated Contact (TOPCon) type solar cells. In this case, the solar cells 110 are interposed between the first semiconductor layer 111 and the second electrode 117 and may include a back passivation structure in which a tunnel oxide layer, polycrystalline silicon, and a silicon nitride layer are stacked.

As another example, the solar cells 110 may be Heterojunction with Intrinsic Thin layer (HIT) type solar cells. In this case, the solar cells 110 may be replaced with a structure including a heterojunction structure in which an intrinsic amorphous silicon layer, an amorphous silicon layer, and a transparent electrode are formed on an upper surface and a lower surface of a single crystal silicon layer, respectively.

In addition, the solar cells 110 may be double-sided light-receiving solar cells instead of the single-sided light-receiving solar cells described with reference to FIG. 2. Furthermore, the solar cells 110 may be multiple p-n junction solar cells instead of the single p-n junction type solar cells described with reference to FIG. 2. In addition, the solar cells 110 may be thin-film solar cells. In this way, the solar cells 110 may be composed of various types of solar cells.

Figure 3:
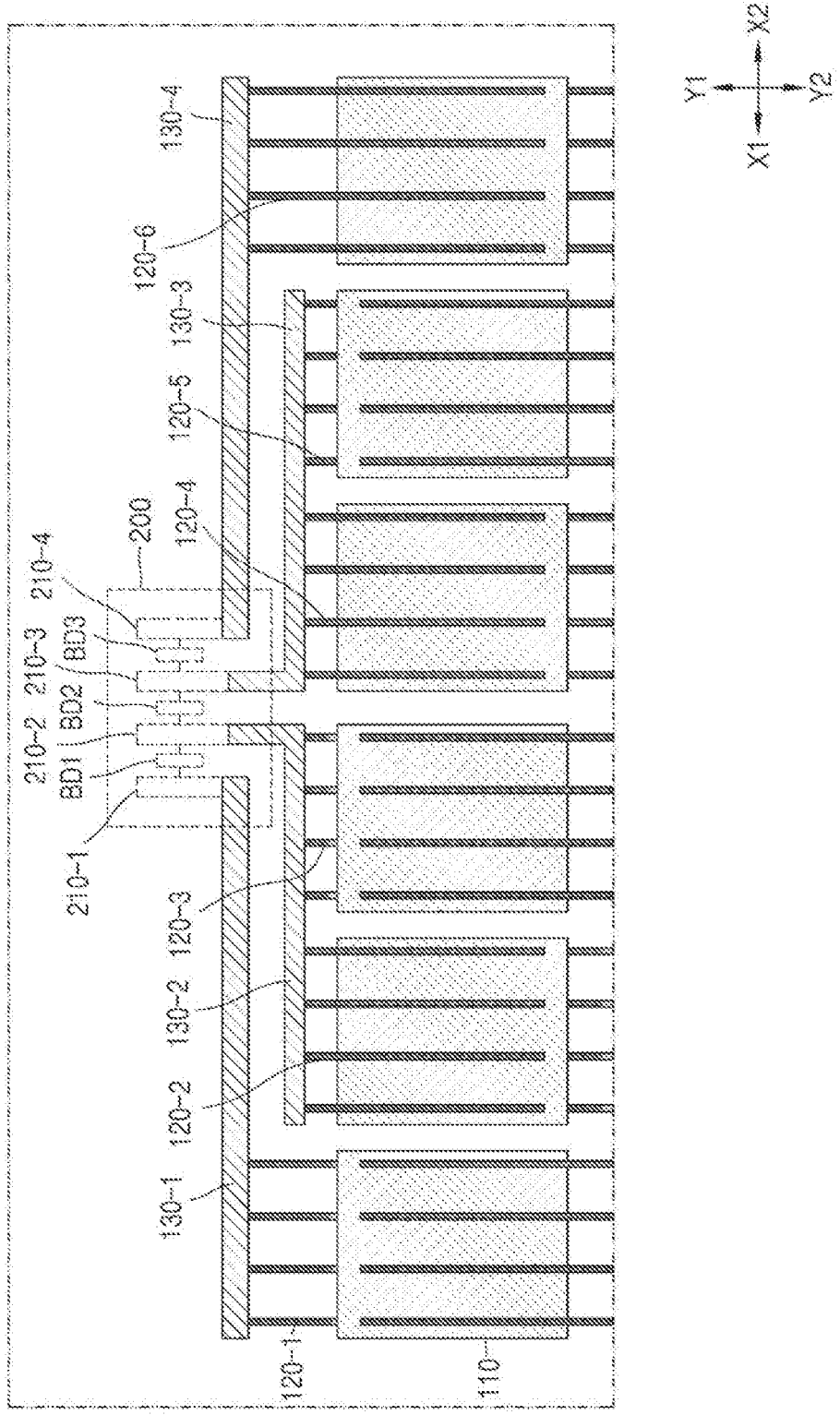
FIG. 3 is an enlarged view of area III of FIG. 1, and is a view for explaining a connection structure between main elements of the solar cell module shown in FIG. 1.

Hereinafter, an electrical connection structure between main elements of the solar cell module 10 will be described in more detail with reference to FIG. 3, which is an enlarged view of area III of FIG. 1.

The solar cell panel 100 of the solar cell module 10 includes a first area A1 in which the solar cells 110 are located and a second area A2 in which the solar cells 110 are not located.

In the first area A1, the solar cells 110 are arranged in the form of a plurality of strings. The string is a minimum series group in which the solar cells 110 are electrically connected to each other in a state in which the solar cells 110 are arranged in a line from an Y1 direction to an Y2 direction. Accordingly, the solar cell module 10 shown in FIG. 1 may include six strings. Hereinafter, a plurality of strings apart from each other at a certain distance from an X1 direction to an X2 direction are sequentially referred to as first to sixth strings S1 to S6.

The solar cells 110 respectively arranged in the first to sixth strings S1 to S6 may be electrically connected to each other by a corresponding first connecting member from among first connecting members 120-1, 120-2, 120-3, 120-4, 120-5, and 120-6.

Taking the first string S1 as an example to describe in more detail, any one of the solar cells 110 adjacent to each other in the first string S1 may be electrically connected to an adjacent solar cell by the first connecting member 120-1.

On the other hand, the first connecting members 120-1, 120-2, 120-3, 120-4, 120-5, and 120-6 may be referred to as bus bars. FIG. 2 shows an embodiment in which the first connecting members 120-1, 120-2, 120-3, 120-4, 120-5, and 120-6 are implemented with 4 bus bars, but the disclosure is not limited thereto. The first connecting members 120-1, 120-2, 120-3, 120-4, 120-5, and 120-6 may be implemented as 6 bus bars and 12 bus bars.

Each of the first connecting members 120-1, 120-2, 120-3, 120-4, 120-5, and 120-6 extend to the second area A2 (Y1 direction), and may be connected to a corresponding one from among second connecting members 130-1, 130-2, 130-3, and 130-4. For example, the first connecting members may be respectively connected to corresponding second connecting members by bonding by a soldering process or the like.

In more detail, the first connecting member 120-1 connected to a solar cell at the uppermost end of the first string S1 may be connected to the second connecting member 130-1. The first connecting member 120-2 connected to a solar cell at the uppermost end of the second string S2, and the first connecting member 120-3 connected to a solar cell at the uppermost end of the third string S3 may be connected to the second connecting member 130-2. The first connecting member 120-4 connected to a solar cell at the uppermost end of the fourth string S4, and the first connecting member 120-connected to a solar cell at the uppermost end of the fifth string S5 may be connected to the second connecting member 130-3. In addition, the first connecting member 120-6 connected to a solar cell arranged at the uppermost end of the sixth string S6 may be connected to the second connecting member 130-4.

Although not shown, each of first connecting members connected to solar cells at the lowermost ends of the first and second strings S1 and S2, first connecting members connected to solar cells at the lowermost end of the third and fourth strings S3 and S4, and first connecting members connected to solar cells at the lowermost ends of the fifth and sixth strings S5 and S6 may extend in the Y2 direction and be connected to a corresponding second connecting member.

Accordingly, the first to sixth strings S1 to S6 may have a structure connected in series.

Each of the second connecting members 130-1 to 130-4 may be connected to a corresponding terminal from among terminals 210-1 to 210-4 formed in the junction box 200. Each of the second connecting members 130-1 to 130-4 may be connected to a corresponding terminal in various ways, such as being joined by a soldering process or being welded by a welding process. For example, the welding process may correspond to various welding processes such as laser welding and ultrasonic welding.

The junction box 200 may include bypass diodes BD1 to BD3 connected between the terminals 210-1 to 210-4. The first bypass diode BD1 may be connected between the terminals 210-1 and 210-2, the second bypass diode BD2 may be connected between the terminals 210-2 and 210-3, and the third bypass diode BD3 may be connected between the terminals 210-3 and 210-4. The bypass diodes BD1 to BD3 may bypass a current transfer path when a problem occurs in any one of the first to sixth strings S1 to S6.

The junction box 200 may be electrically connected to a cable of neighboring solar cell modules (or a current measuring device in FIG. 4, etc.) through cables C1 and C2 connected to external terminals.

Figure 4:
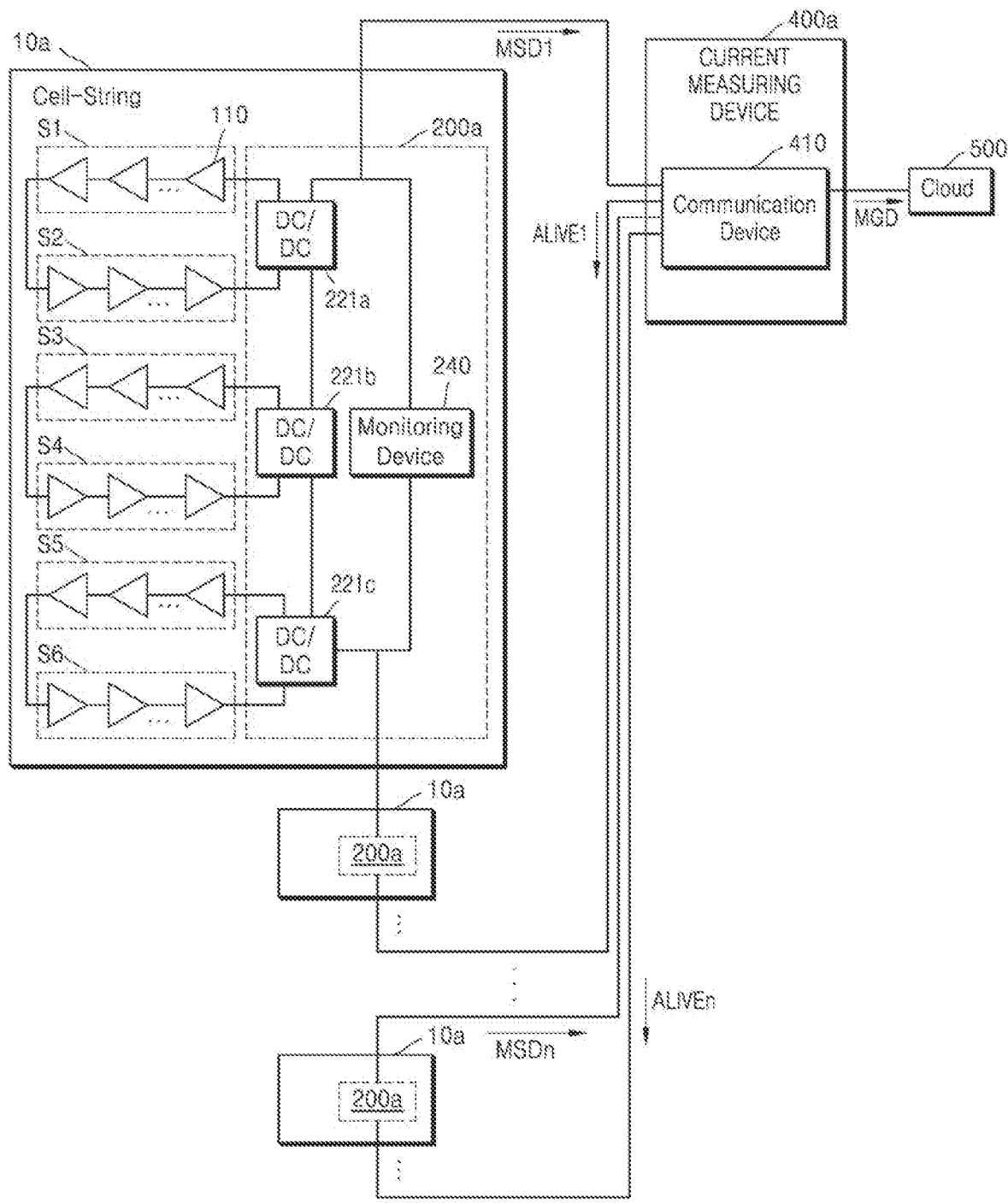
FIG. 4 is a view of a monitoring device included in a solar cell module and a photovoltaic system including the monitoring device, according to an embodiment.
Figure 5:
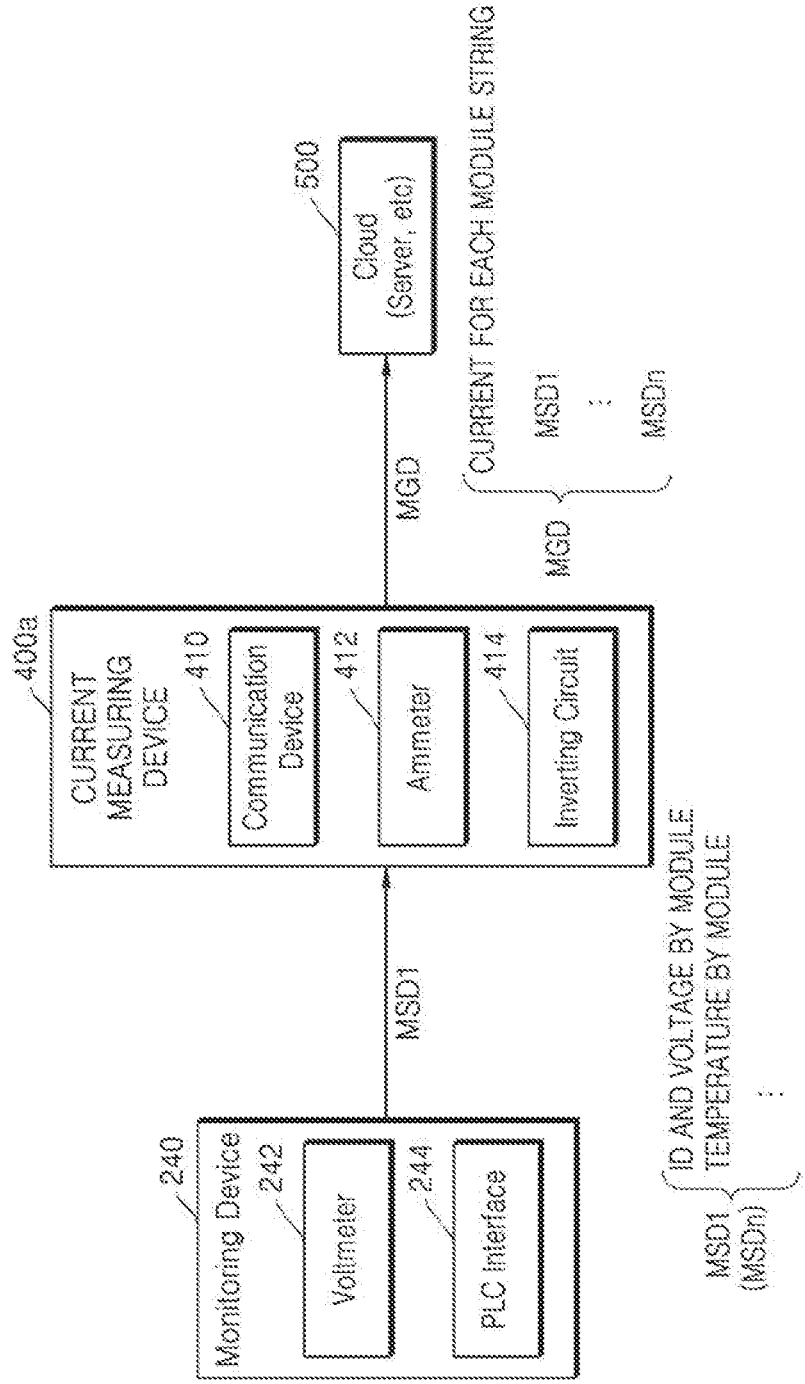
FIG. 5 is a view for explaining in more detail an operation of the photovoltaic system, according to the embodiment of FIG. 4, obtaining data for monitoring the amount of power generated by solar cell modules.

FIG. 4 is a view of a monitoring device included in a solar cell module and a photovoltaic system including the monitoring device, according to an embodiment. FIG. 5 is a view for explaining in more detail an operation of the photovoltaic system, according to the embodiment of FIG. 4, obtaining data for monitoring the amount of power generated by solar cell modules.

Referring to FIG. 4, the photovoltaic system may include a plurality of solar cell modules 10*a*. The plurality of solar cell modules 10*a* may be divided into one or more module strings (e.g., n module strings, where n is a natural number), and each of the one or more module strings may be connected to a current measuring device 400*a*. At least one solar cell module 10*a* included in the module string may be connected in series (or connected in a cascade structure) to the current measuring device 400*a*. Accordingly, currents of the solar cell modules 10*a* included in the same module string may be the same.

As described above in FIGS. 1 to 3, the solar cell module 10*a* may include a plurality of solar cells 110 arranged in the plurality of strings S1 to S6. The plurality of strings S1 to S6 may be connected in series to each other by the first connecting members 120-1 to 120-6 and the second connecting members 130-1 to 130-4.

Meanwhile, the solar cell module 10*a* according to an embodiment may include DC/DC converters 221*a*, 221*b*, and 221*c* provided in a junction box 200*a*. Each of the DC/DC converters 221*a*, 221*b*, and 221*c*, similar to the bypass diodes BD1 to BD3 described above in FIG. 3, may be connected in parallel to some of the strings S1 to S6 by being connected between the terminals 210-1 to 210-4. According to an embodiment of FIG. 4, the first DC/DC converter 221*a* may be connected in parallel to a first cell string S1+S2 including the first string S1 and the second string S2. The second DC/DC converter 221*b* may be connected in parallel to a second cell string S3+S4 including the third string S3 and the fourth string S4. The third DC/DC converter 221*c* may be connected in parallel to a third cell string S5+S6 including the fifth string S5 and the sixth string S6. Based on this, the plurality of solar cells 110 connected in series with each other may be conceptually divided into a plurality of cell strings by the DC/DC converters 221*a*, 221*b*, and 221*c*, and each of the plurality of cell strings may include some of the solar cells 110 continuously connected to each other from among the solar cells 110.

Each of the DC/DC converters 221*a*, 221*b*, and 221*c* may convert a DC voltage formed in a corresponding cell string into a DC voltage having a different value. According to an example of FIG. 4, the first DC/DC converter 221*a* may convert a DC voltage formed by the solar cells 110 of the first cell strings S1 and S2. The second DC/DC converter 221*b* may convert a DC voltage formed by the solar cells 110 of the second cell strings S3 and S4. The third DC/DC converter 221c may convert a DC voltage formed by the solar cells 110 of the third cell strings S5 and S6.

According to an embodiment, each of the DC/DC converters 221a, 221b, and 221c may be implemented as a converter having a Maximum Power Point Tracking (MPPT) function, and may convert a DC voltage formed in a corresponding cell string into a DC voltage having an appropriate value so that the efficiency of power provided from the corresponding cell string is maximized.

Even if the DC/DC converters 221a, 221b, and 221c are connected to each other in a cell string unit so that a specific solar cell 110 does not function normally due to shading, etc., the effect (decreased power generation) may be limited only to a cell string including the specific solar cell 110. Accordingly, a decrease in the total amount of power generated by the solar cell module 10a may be minimized.

Figure 12:
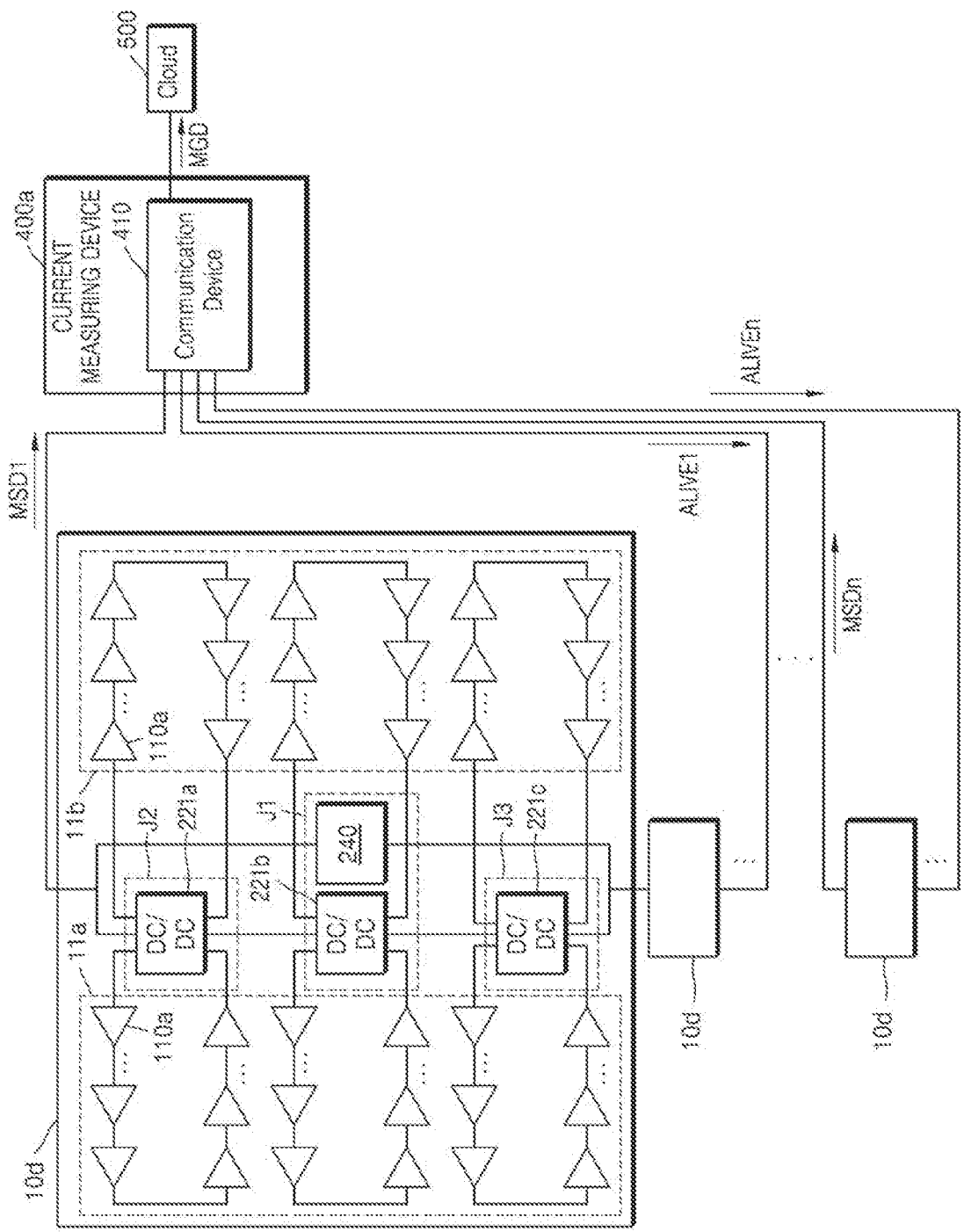
FIG. 12 is a view illustrating an embodiment of a monitoring device included in a half-cut cell solar cell module and a photovoltaic system including the monitoring device.

According to an embodiment, the solar cell module 10a may include a plurality of junction boxes as shown in FIG. 12. In this case, the DC/DC converters 221a to 221c may be separately accommodated in the plurality of junction boxes, and a monitoring device 240 may be accommodated in any one of the plurality of junction boxes (e.g., a main junction box). The plurality of junction boxes may be connected to each other through cables.

Meanwhile, in order to measure generated power of the solar cell module 10a, a voltage of the solar cell module 10a (hereinafter defined as 'module voltage') and a current of the solar cell module 10a (hereinafter defined as 'module current') need to be measured. In the conventional case, the solar cell modules 10a are implemented to individually measure the module voltage and module current, and to transmit the measured module voltage and module current to an inverter or a gateway, respectively. According to the conventional method, because each of the solar cell modules 10a has a device for measuring the module voltage and the module current, the cost of the module may increase. In addition, because each of the solar cell modules 10a transmits a module voltage and a module current to the inverter or gateway, a data transmission load may increase and data management may be inefficient.

According to an embodiment, each of the solar cell modules 10a measures only a module voltage, and a module current is implemented to be measured by the current measuring device 400a such as an inverter or a gateway, so that a structure of a module may be simplified and data may be efficiently managed.

In this regard, the solar cell module 10a according to an embodiment may further include a monitoring device 240. The monitoring device 240 may be provided in the junction box 200a of the solar cell module 10a.

The monitoring device 240 may be connected (in parallel) to both ends of the plurality of series-connected DC/DC converters 221a, 221b, and 221c to measure a module voltage corresponding to a sum of respective voltages of the DC/DC converters 221a, 221b, and 221c. To this end, the monitoring device 240 may include a voltage measuring device such as a voltmeter 242.

The monitoring device 240 may transmit module data including a measured module voltage to the current measuring device 400a. For example, the monitoring device 240 may include a power line communication (PLC) interface 244 to transmit the module data to the current measuring device 400a according to a power line communication method. The module data may include, but is not limited to, the module voltage, identification information (ID, serial number, etc.) of the solar cell module 10a, and/or the temperature of the solar cell module 10a. In addition, according to an embodiment, the monitoring device 240 may be implemented to transmit the module data to the current measuring device 400a according to a wired/wireless communication method other than the power line communication method.

Meanwhile, when the solar cell modules 10a are included in a module string and connected in series with each other as shown in FIG. 4, the monitoring device 240 may transmit the module data (or data combining the module data and module data received from the previous solar cell module 10a) to the monitoring device 240 of the next solar cell module 10a. In this case, the monitoring device 240 included in the last solar cell module 10a of the module string may receive module data for each of the other solar cell modules 10a of the module string from the previous monitoring device. The monitoring device 240 included in the last solar cell module 10a may transmit module string data MSDn (n is a natural number) combining the module data for the corresponding solar cell module 10a and the received module data to the current measuring device 400a. For example, first module string data MSD1 may include a module voltage of each of the solar cell modules 10a included in the first module string.

However, according to an embodiment, the solar cell module 10a (monitoring device 240) may bypass (or bypass after amplification) module data received from the previous solar cell module 10a without transmitting the module data together with module data of the current solar cell module 10a. In this case, module data of each of the solar cell modules 10a included in the module string may be independently transmitted to the current measuring device 400a. To this end, the module data of each of the solar cell modules 10a may be transmitted through different frequency bands, or encoded with different pieces of code and transmitted so that each module data may be distinguished.

The current measuring device 400a may be implemented as an inverter or a gateway. The current measuring device 400a may receive power and the module string data MSD1 to MSDn from each of the module strings. The power may correspond to a sum of power provided from the solar cell modules 10a included in the module string.

When the pieces of module string data MSD1 to MSDn are received together with the power through a power line, a communication device 410 of the current measuring device 400a may divide the received power and module string data. For example, power and module string data received through a power line may have different frequencies. Based on this, the communication device 410 may divide the power and the module string data received through the power line using a filter or the like. The communication device 410 may include a communication interface such as a power line communication modem.

The current measuring device 400a may include a current measuring device such as an ammeter 412 for measuring a current of a module string from the divided power. For example, the current measuring device is provided to correspond to the number of module strings connected to the current measuring device 400a, and may measure a current of each of the module strings. According to an embodiment, the current measuring device may be provided in a number less than the number of the module strings. In this case, the current measuring device 400a may further include at least one switch to sequentially measure the current of each of the module strings through appropriate switching control.

Because the solar cell modules 10a included in the module string are connected in series with each other, the current of each of the module strings measured by the current measuring device 400*a* may correspond to a module current of each of the solar cell modules 10*a* included in the module string. Accordingly, as in the related art, problems such as load waste, cost increase, and data transmission load increase due to each of the solar cell modules 10*a* being implemented to measure a module current may be effectively solved.

The current measuring device 400*a* may transmit module group data MGD including a current measured for each module string and the received module string data MSD1 to MSDn to a Cloud 500 (server, administrator terminal, etc.). A module group may be defined as including all solar cell modules 10*a* connected to the current measuring device 400*a*. The current measuring device 400*a* and the Cloud 500 may be connected to each other according to a communication method such as Ethernet. To this end, the communication device 410 of the current measuring device 400*a* may be implemented as a modem that supports the power line communication method and an Ethernet communication method, respectively.

According to an embodiment, the current measuring device 400*a*, based on the current measured for each module string and the module voltages included in the module string data MSD1 to MSDn, may directly calculate information about the amount of power generated by each of the solar cell modules 10*a*, the amount of power generated by each module string, or the total amount of power generated by the module group, and may transmit the information to the Cloud 500.

According to an embodiment, when the current measuring device 400*a* is implemented as an inverter, the current measuring device 400*a* may further include an inverter circuit 414. The inverter circuit 414 may convert the divided power into AC power and provide the AC power to a grid or an electronic device.

Figure 6:
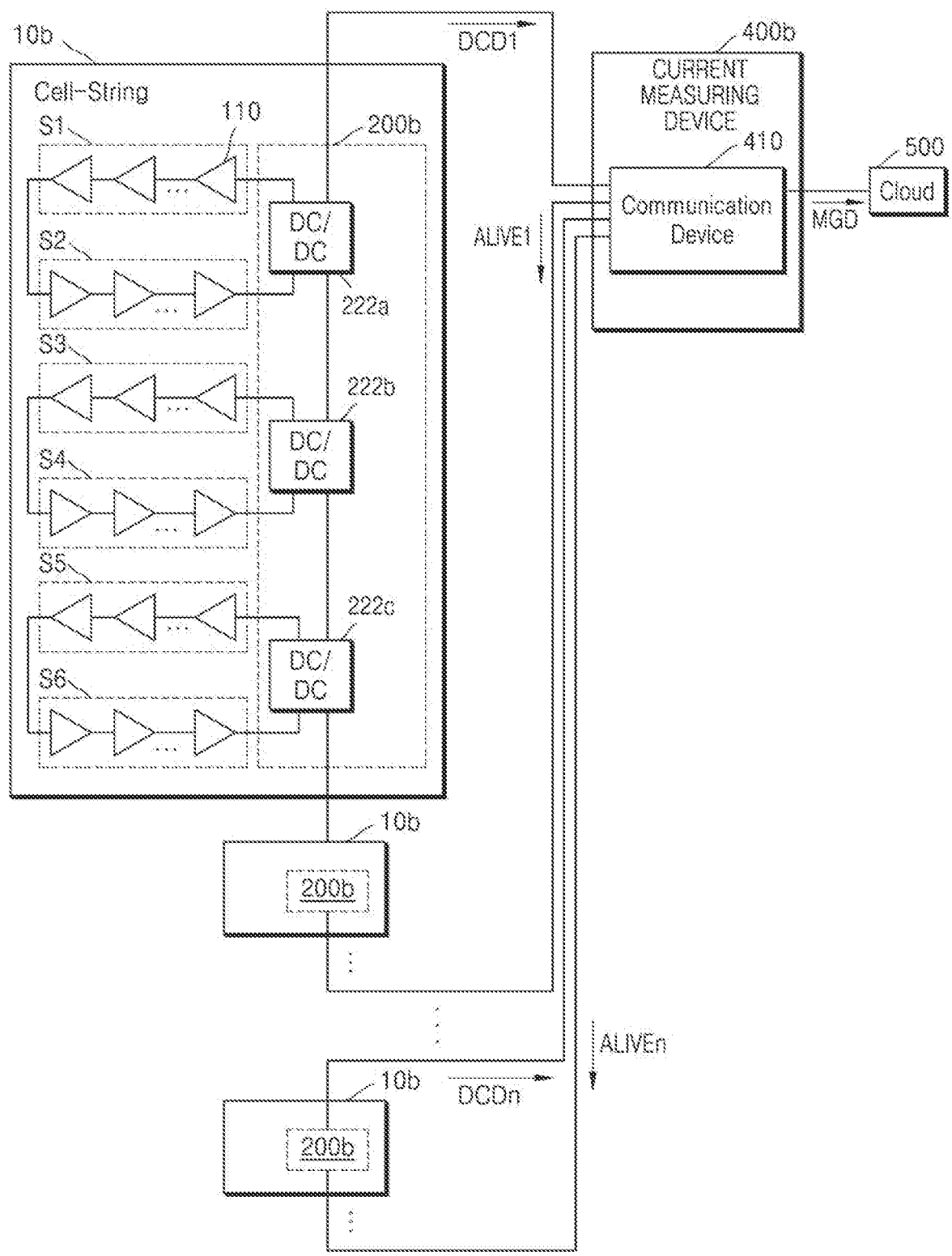
FIG. 6 is a view of a photovoltaic system according to an embodiment.
Figure 7:
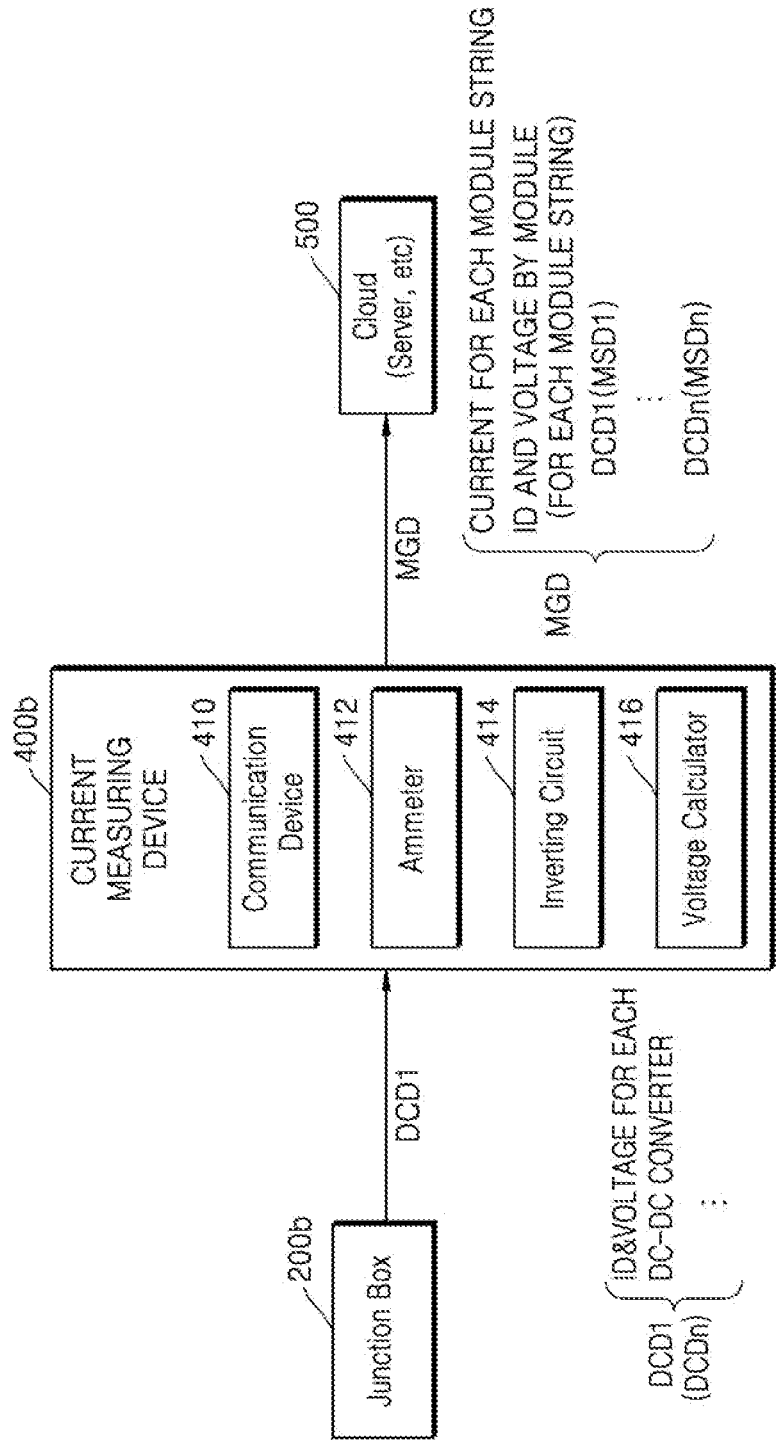
FIG. 7 is a view for explaining in more detail an operation of the photovoltaic system, according to the embodiment of FIG. 6, obtaining data for monitoring the amount of power generated by solar cell modules.

FIG. 6 is a view of a photovoltaic system according to an embodiment. FIG. 7 is a view for explaining in more detail an operation of the photovoltaic system, according to the embodiment of FIG. 6, obtaining data for monitoring the amount of power generated by solar cell modules.

Referring to FIGS. 6 and 7, unlike the embodiments of FIGS. 4 and 5, a solar cell module 10*b* may be implemented so as not to include a separate monitoring device 240. Alternatively, DC/DC converters 222*a*, 222*b*, and 222*c* provided in a junction box 200*b* may function as the above-described monitoring devices. In more detail, each of the DC/DC converters 222*a*, 222*b*, and 222*c* may include a power line communication interface (not shown) to transmit converter data including a converted voltage to the current measuring device 400*b*. The converter data may include, but is not limited to, the converted voltage, identification information (ID, serial number, etc.) of a DC/DC converter, and/or temperature.

Meanwhile, because the DC/DC converters 222*a*, 222*b*, and 222*c* are connected in series with each other, and the solar cell modules 10*a* included in the module string are also connected in series with each other, all DC/DC converters included in the module string may also be connected in series with each other. Accordingly, each of the DC/DC converters may transmit the converter data (or data combining the converter data and converter data received from the previous DC/DC converter) to the next DC/DC converter. In this case, the last DC/DC converter 222*a* of the module string may receive converter data for each of the other DC/DC converters of the module string. The last DC/DC converter 222*a* of the module string may transmit converter data including a converted voltage and module string data DCDn (n is a natural number) including the received converter data to the current measuring device 400*b*. For example, first module string data DCD1 may include a voltage, identification information, and a temperature of each of a plurality of DC/DC converters included in a first module string.

The current measuring device 400*b* may receive power and the module string data DCD1 to DCDn from each of the module strings through a power line. The power may correspond to a sum of power provided from the solar cell modules 10*b* included in the module string.

The communication device 410 of the current measuring device 400*b* may divide the received power and module string data. The current measuring device 400*b* may include a current measuring device such as the ammeter 412 for measuring a current of the module string (corresponding to a module current) from the divided power. Because the communication device 410 and the current measuring device have been described above with reference to FIGS. 4 to 5, a redundant description thereof will not be given herein.

The current measuring device 400*b* may further include a voltage calculator 416 that calculates a module voltage of each of the solar cell modules 10*b* based on a voltage of each of DC/DC converters included in the received module string data DCDn. The voltage calculator 416 may calculate the module voltage by classifying the DC/DC converters for each solar cell module based on identification information of each of the DC/DC converters and summing voltages of DC/DC converters included in each of the solar cell modules 10*b*. According to an embodiment, the voltage calculator 416 may calculate a module string voltage by summing all voltages of the DC/DC converters.

The current measuring device 400*b* may transmit the module group data MGD including a current measured for each module string, a module voltage of each of the solar cell modules 10*b* (or a voltage of each of the module strings), and the received module string data DCD1 to DCDn to the Cloud 500. According to an embodiment, the current measuring device 400*b* may generate and transmit the module string data MSD1 to MSDn as described above with reference to FIGS. 4 to 5 using the module voltage calculated for each of the solar cell modules 10*b* and the received module string data DCD1 to DCDn.

Meanwhile, according to an embodiment, for prevention of unnecessary increase in data transmission load, efficient management, and minimization of communication interference, the monitoring device 240 (or a DC/DC converter) may transmit the module string data MSD1 to MSDn or DCD1 to DCDn to the current measuring device 400*a* or 400*b* according to a preset period or timing. Various embodiments related thereto will be described below with reference to FIGS. 8 to 10.

FIGS. 8A-8B to FIGS. 10A-10B are timing diagrams illustrating embodiments in which module string data or DC-DC converter data is transmitted from solar cell modules to a current measuring device.

Referring to FIGS. 8A-8B to FIGS. 10A-10B, the current measuring device 400*a* or 400*b* may periodically transmit signals ALIVE1 to ALIVEn to each of module strings. The monitoring device 240 or DC/DC converters 222*a*, 222*b*, and 222*c* included in each of the module strings may transmit (e.g., sequentially transmit) data including a voltage (module data or converter data) in response to the signals. Accordingly, the module string data MSD1 to MSDn or DCD1 to DCDn may be transmitted to the current measuring device 400*a* or 400*b*.

For example, the signals ALIVE1 to ALIVEn according to the embodiments of FIGS. 8A-8B to FIGS. 10A-10B may be signals periodically transmitted from an inverter to a DC/DC converter in relation to a rapid shutdown function. Because the monitoring device 240 is connected to a DC/DC converter and an inverter (current measuring device) through a power line, the monitoring device 240 may receive the signals ALIVE1 to ALIVEn to transmit the module string data MSD1 to MSDn. However, the types of the signals ALIVE1 to ALIVEn are not limited thereto, and may include various signals output to control transmission of the module string data MSD1 to MSDn or DCD1 to DCDn.

Based on this, referring to FIGS. 8A and 8B, the current measuring device 400a or 400b may simultaneously transmit the signals ALIVE1 to ALIVEn to each of the module strings. The solar cell module 10a or 10b included in each of the module strings may transmit data including a module voltage (or a converted voltage of a DC/DC converter) to the next solar cell module in response to the signals ALIVE1 to ALIVEn. The last solar cell module 10a or 10b of the module string may transmit the module string data MSDn or DCDn including a module voltage (or a converted voltage of a DC/DC converter) of solar cell modules included in the module string to the current measuring device 400a or 400b. At this time, when a separate delay time is not set for each of the module strings or the same delay time is set, time points at which the current measuring device 400a or 400b receives the module string data MSD1 to MSDn or DCD1 to DCDn of the module strings may be the same (or at least partially overlap).

The module string data MSD1 to MSDn or DCD1 to DCDn may be transmitted before an output time point of the next signal to prevent overlapping with the next signal. In addition, the module string data MSD1 to MSDn or DCD1 to DCDn may be transmitted every time the signals ALIVE1 to ALIVEn are received as shown in FIG. 8A, but according to an embodiment, as shown in FIG. 8B, the module string data MSD1 to MSDn or DCD1 to DCDn may be transmitted when the signals ALIVE1 to ALIVEn are received a preset number of times as shown in FIG. 8B.

Figure 9A:
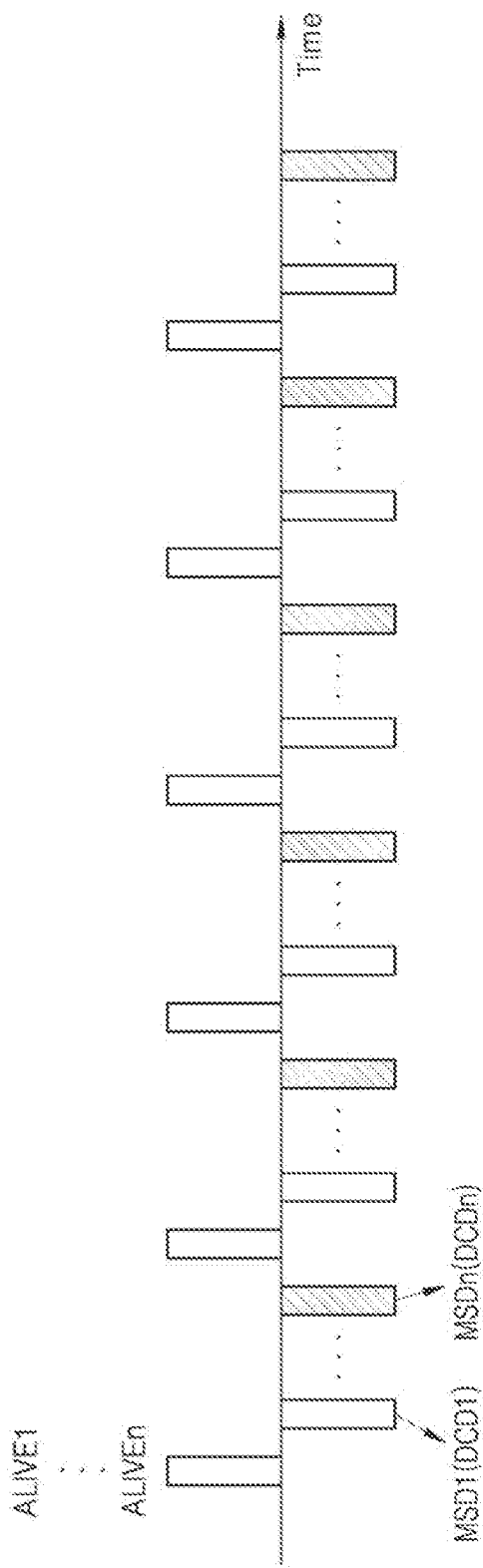
Figure 9B:
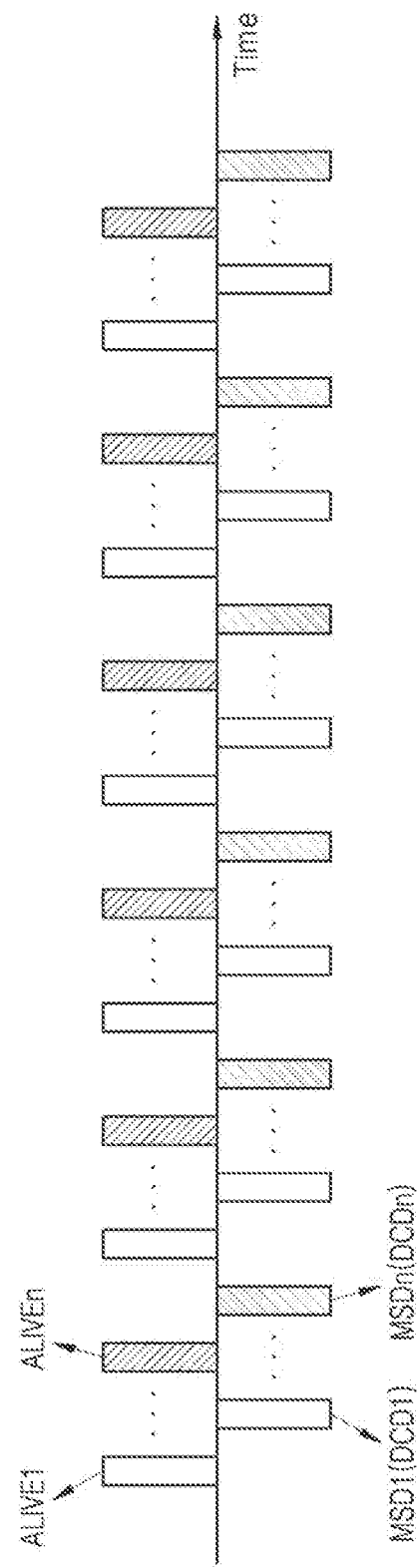

Referring to the embodiments of FIGS. 9A and 9B, in order to reduce a load of the communication device 410 according to simultaneous reception of the module string data MSD1 to MSDn or DCD1 to DCDn, and to efficiently manage and process the module string data MSD1 to MSDn or DCD1 to DCDn, the current measuring device 400a or 400b may receive the module string data MSD1 to MSDn or DCD1 to DCDn of the module strings at different time points.

For example, different delay times may be set for the signals ALIVE1 to ALIVEn in each of the module strings. In this case, when the signals ALIVE1 to ALIVEn are simultaneously transmitted to each of the module strings as shown in FIG. 9A, each of the module strings may transmit the module string data MSD1 to MSDn or DCD1 to DCDn after a set delay time has elapsed. Accordingly, the communication device 410 of the current measuring device 400a or 400b may sequentially receive the module string data MSD1 to MSDn or DCD1 to DCDn of the module strings.

Referring to the embodiment shown in FIG. 9B, the current measuring device 400a or 400b may receive the module string data MSD1 to MSDn or DCD1 to DCDn at different time points by transmitting the signals ALIVE1 to ALIVEn to each of the module strings at different time points.

Figure 10A:
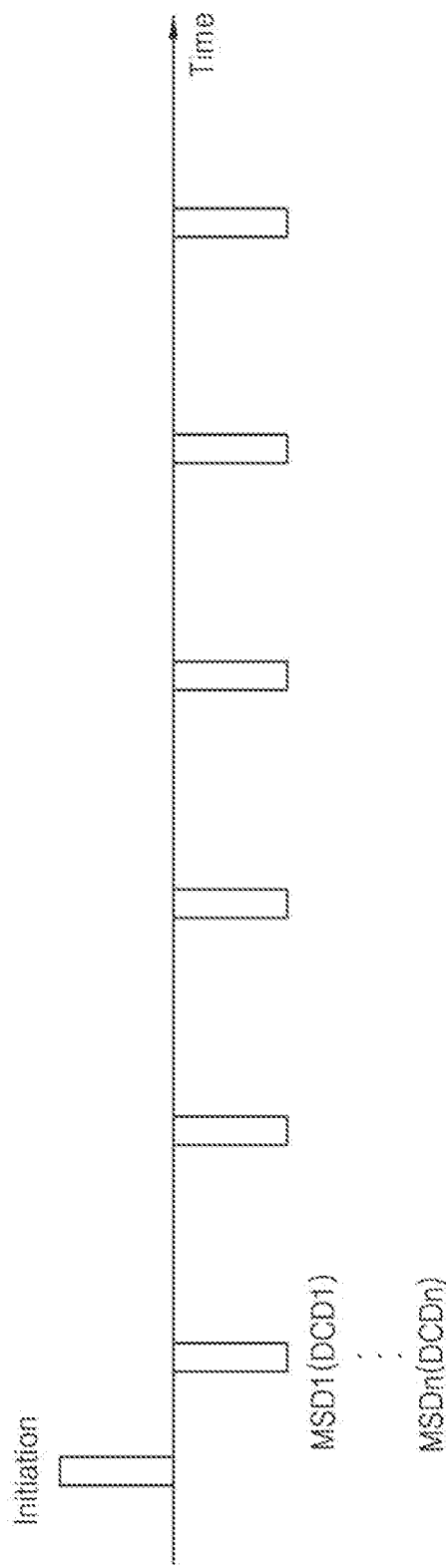
Figure 10B:
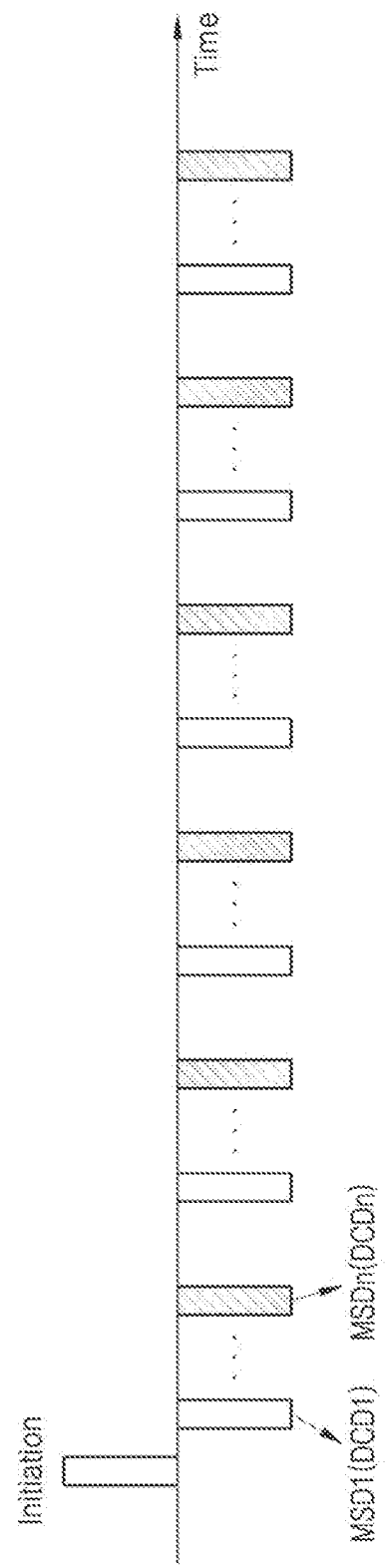

On the other hand, referring to the embodiments of FIGS. 10A and 10B, the module strings (solar cell modules 10a or 10b) may periodically transmit the module string data MSD1 to MSDn or DCD1 to DCDn to the current measuring device 400a or 400b without receiving a separate periodic signal from the current measuring device 400a or 400b. For example, when a photovoltaic system is not equipped with a rapid shutdown function, the current measuring device (inverter) may not periodically output the signals ALIVE1 to ALIVEn. In this case, the module strings may transmit the module string data MSD1 to MSDn or DCD1 to DCDn to the current measuring device 400a or 400b according to a preset transmission period after receiving a specific signal (e.g., an initial signal (Initiation)) from the current measuring device 400a or 400b or after power is turned on. The transmission period may be changed automatically or by an administrator according to an installation environment or an operating environment of the solar cell modules.

For example, as shown in FIG. 10A, the module strings may transmit the module string data MSD1 to MSDn or DCD1 to DCDn at the same time. Alternatively, as shown in FIG. 10B, the module strings may transmit the module string data MSD1 to MSDn or DCD1 to DCDn at different times (the time intervals may be the same).

According to the embodiment of FIGS. 10A and 10B, unlike FIGS. 8A-8B and 9A-9B, because the overlap between the signals ALIVE1 to ALIVEn transmitted and received through the power line and the module string data MSD1 to MSDn or DCD1 to DCDn may not be considered, transmission timing of the module string data may be more freely set.

Hereinafter, various modifications of a photovoltaic system based on the inventive concept will be described with reference to FIGS. 11 to 14.

Figure 11:
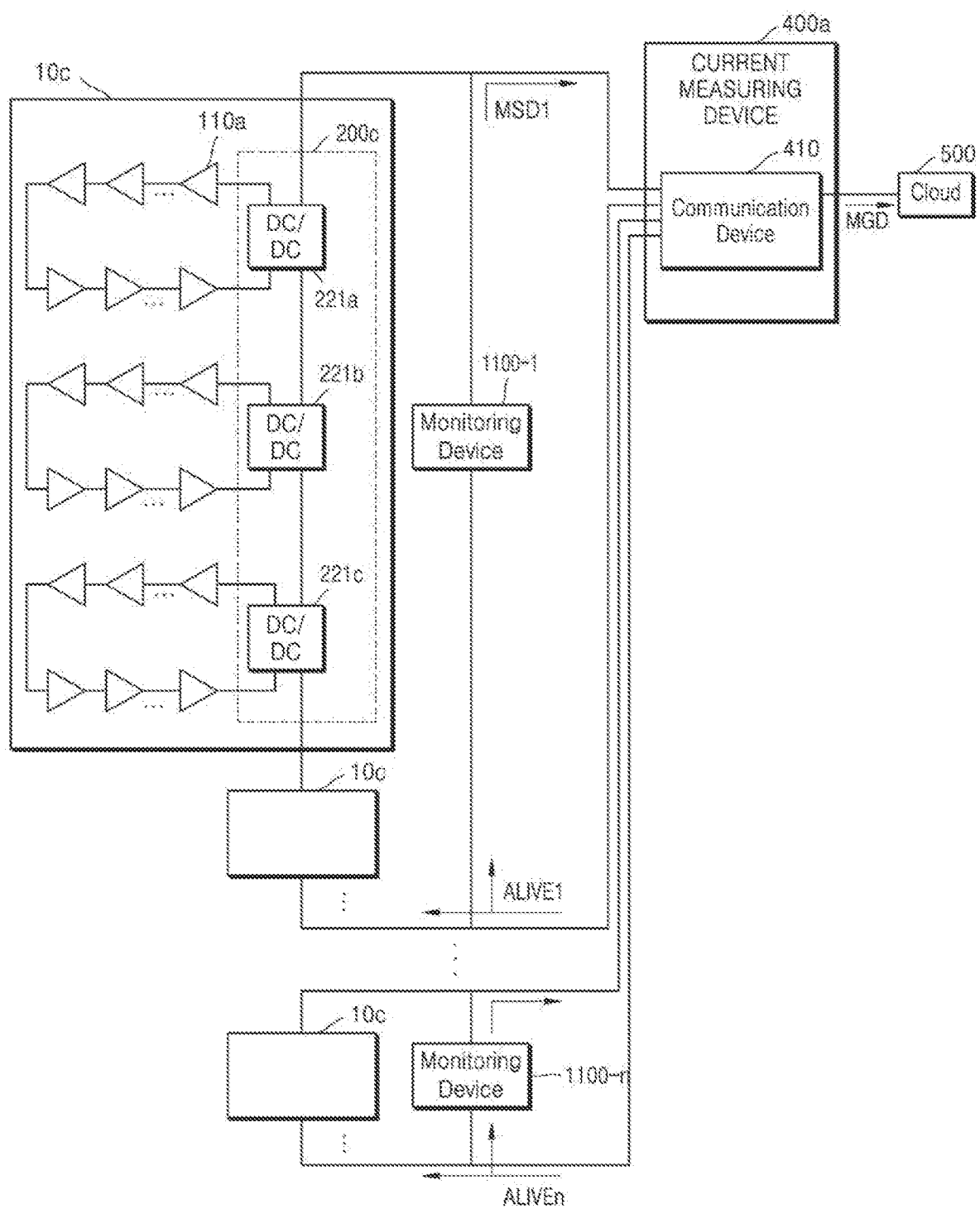
FIG. 11 is a view illustrating an embodiment of a monitoring device implemented to be connected to solar cell modules and a photovoltaic system including the monitoring device.

FIG. 11 is a view illustrating an embodiment of a monitoring device implemented to be connected to solar cell modules and a photovoltaic system including the monitoring device.

Referring to FIG. 11, monitoring devices 1100-1 to 1100-n may be implemented as an external monitoring device provided outside a solar cell module 10c, unlike the embodiment of FIG. 4. The external monitoring device may be provided to be connected to both ends of the solar cell module 10c similarly to the embodiment of FIG. 4, but may be provided to be connected to both ends of each of the module strings as shown in FIG. 11. In this case, the number of the monitoring devices 1100-1 to 1100-n may correspond to the number of module strings.

When the monitoring devices 1100-1 to 1100-n are provided to be connected to both ends of each of the module strings, each of the monitoring devices 1100-1 to 1100-n may measure a voltage of the connected module string in response to the signals ALIVE1 to ALIVEn. The monitoring devices 1100-1 to 1100-n may transmit the module string data MSD1 to MSDn including the measured voltage of the module string to the current measuring device 400a. The module string data MSD1 to MSDn may be transmitted to the current measuring device 400a based on the embodiments of FIGS. 8 to 10.

The current measuring device 400a may receive power and module string data of each of the module strings through a power line. The current measuring device 400a may measure a module current of each of the module strings based on the received power, and transmit the module group data MGD including the measured module current and the module string data to the Cloud 500. The operation of the current measuring device 400a is similar to the operations described above with reference to FIGS. 4 to 5, and a detailed description thereof will not be given herein.

According to the embodiment of FIG. 11, because the monitoring devices 1100-1 to 1100-*n* are provided in an external form, the monitoring devices 1100-1 to 1100-*n* may be easily provided to a conventional photovoltaic system already installed. In addition, a current measuring device (inverter or gateway) of the conventional photovoltaic system may not include a current measuring device (the ammeter 412, etc.). In this case, because the current measuring device is additionally installed in the current measuring device and software such as firmware is updated, a photovoltaic system having the inventive concept may be provided.

FIG. 12 is a view illustrating an embodiment of a monitoring device included in a half-cut cell solar cell module and a photovoltaic system including the monitoring device.

Referring to FIG. 12, solar cells 110*a* of a solar cell module 10*d* may be divided solar cells formed by dividing a unit solar cell into a plurality of portions having symmetrical shapes. For example, the solar cells 110*a* may be divided solar cells formed by dividing a unit solar cell in half. In this case, the divided solar cells may be referred to as a half cell or a half-cut cell, etc., and the solar cell module 10*d* may be referred to as a half-cell solar cell module or a half-cut cell solar cell module.

For example, the solar cells 110*a* of the solar cell module 10*d* may be divided into a first cell group 11*a* and a second cell group 11*b*. The solar cells 110*a* included in the first cell group 11*a* may be connected in series with each other, and the solar cells 110*a* included in the second cell group 11*b* may be connected in series with each other. The first cell group 11*a* and the second cell group 11*b* may be symmetrically arranged on the solar cell panel 100 (see FIG. 1), but the disclosure is not limited thereto.

The solar cell module 10*d* may include the DC/DC converters 221*a*, 221*b*, and 221*c* respectively accommodated in a plurality of junction boxes J1, J2, and J3. For example, the first junction box J1 may correspond to a main junction box in which the monitoring device 240 is accommodated together, and the second junction box J2 and the third junction box J3 may correspond to sub-junction boxes. However, according to an embodiment, the solar cell module 10*d* may include only one junction box.

Each of the DC/DC converters 221*a*, 221*b*, and 221*c* may be connected to the solar cells 110*a* in a manner similar to that described above in FIG. 4. In more detail, each of the DC/DC converters 221*a*, 221*b*, and 221*c* may be connected in parallel to any one of a plurality of cell strings so that the plurality of solar cells 110*a* included in the first cell group 11*a* are divided into the plurality of cell strings. In addition, each of the DC/DC converters 221*a*, 221*b*, and 221*c* may be connected in parallel to any one of a plurality of cell strings so that the plurality of solar cells 110*a* included in the second cell group 11*b* are divided into the plurality of cell strings. In FIG. 12, each of the plurality of DC/DC converters 221*a*, 221*b*, and 221*c* is illustrated as being connected to some of the solar cells of the first cell group 11*a* and some of the solar cells of the second cell group 11*b*, but according to an embodiment, each of the plurality of DC/DC converters may be connected to only some of the solar cells included in any one of the first cell group 11*a* and the second cell group 11*b*.

The monitoring device 240 may be connected (in parallel) to both ends of the plurality of DC/DC converters 221*a*, 221*b*, and 221*c* connected in series with each other to measure a module voltage of the solar cell module 10*d*. The monitoring device 240 may transmit module data including the measured module voltage to the current measuring device 400*a*. As described above in FIG. 4, the monitoring device 240 included in the last solar cell module 10*d* of the module string may transmit the module string data MSDn including a module voltage for each of the solar cell modules 10*d* of the module string to the current measuring device 400*a*.

The current measuring device 400*a* may receive power and the module string data MSD1 to MSDn from each of the module strings, and measure a module current of each of the module strings from the received power. The current measuring device 400*a* may transmit the module group data MGD including the module string data MSD1 to MSDn and the measured module current of each of the module strings to the Cloud 500.

Figure 13:
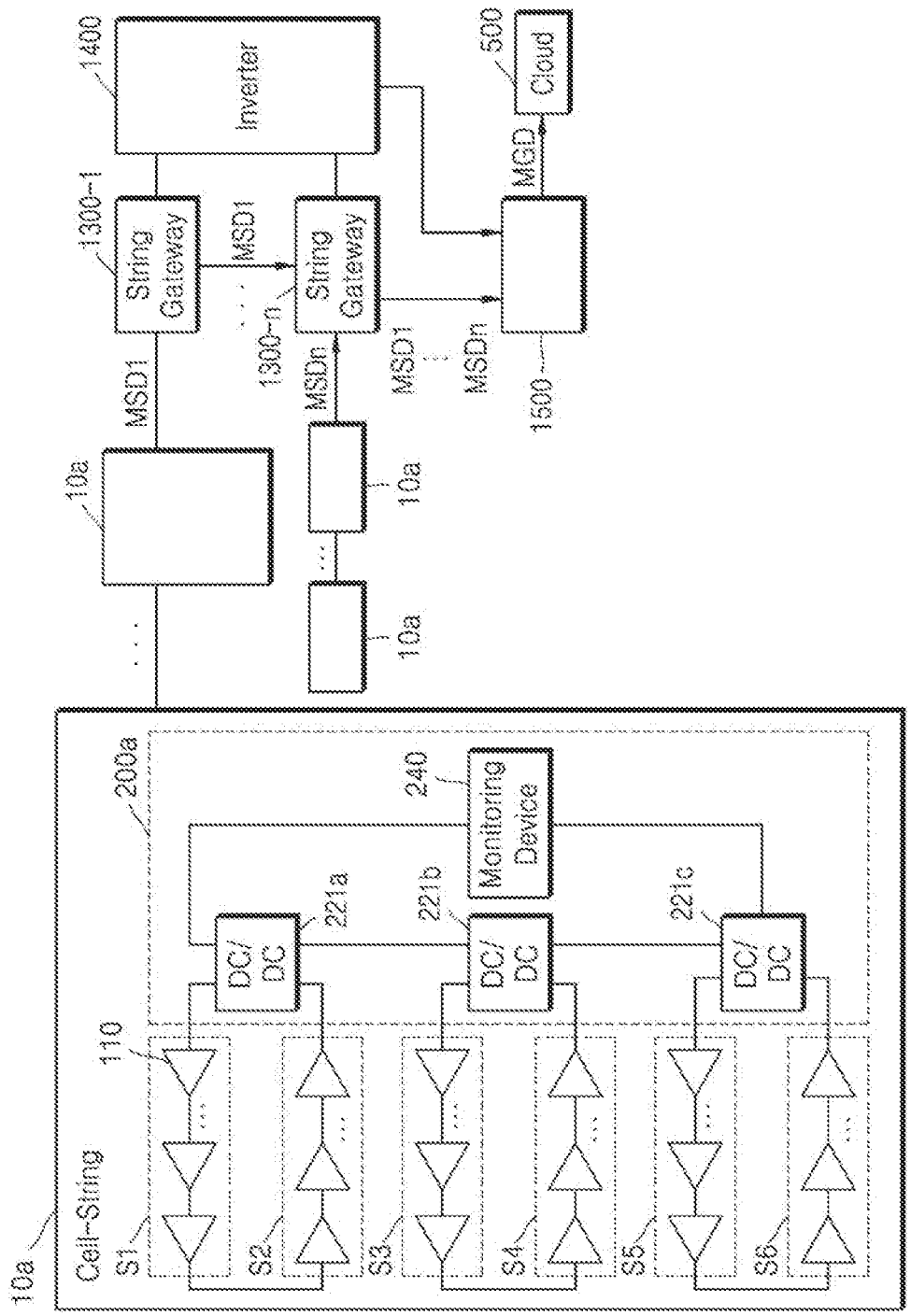
FIGS. 13 and 14 are views illustrating embodiments of a photovoltaic system implemented to obtain data for monitoring the amount of power generated by solar cell modules using a plurality of gateways.
Figure 14:
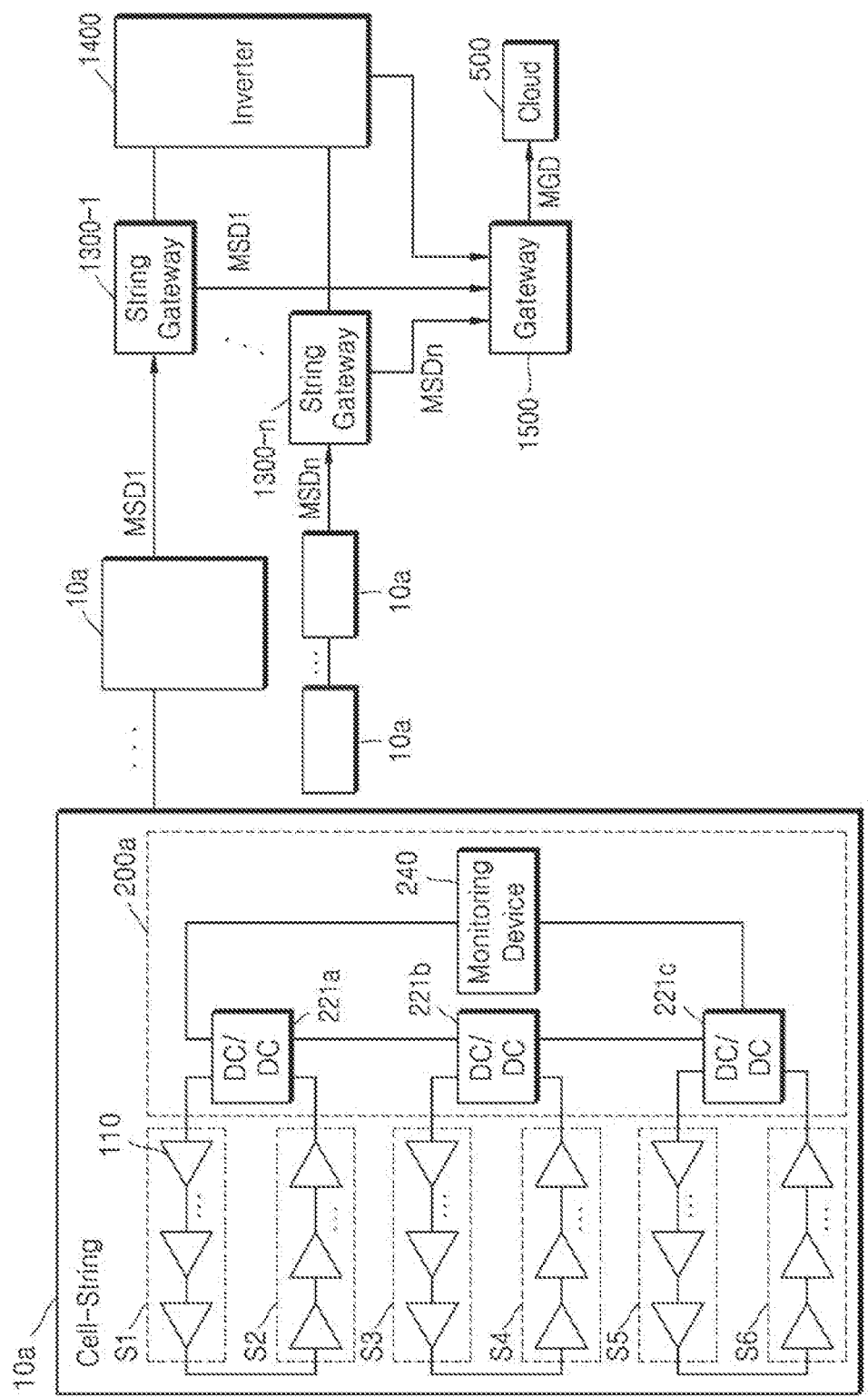

FIGS. 13 and 14 are views illustrating embodiments of a photovoltaic system implemented to obtain data for monitoring the amount of power generated by solar cell modules using a plurality of gateways.

Referring to FIGS. 13 and 14, the photovoltaic system may include string gateways 1300-1 to 1300-*n* (n is a natural number) corresponding to module strings. Each of the string gateways 1300-1 to 1300-*n* may be connected to a corresponding one of the module strings to receive module string data. The module string data may correspond to the module string data according to the embodiments shown in FIGS. 4 to 12. Although not shown, the string gateways 1300-1 to 1300-*n* may transmit the signals ALIVE1 to ALIVEn shown in FIG. 4 and the like to the connected module strings, respectively.

The string gateways 1300-1 to 1300-*n* may separate power and the module string data MSD1 to MSDn received from the connected module strings, respectively. The string gateways 1300-1 to 1300-*n* may transmit the separated module string data MSD1 to MSDn to a main gateway 1500, respectively.

In more detail, according to the embodiment of FIG. 13, the string gateways 1300-1 to 1300-*n* may be connected to each other in a cascade structure, and only the last string gateway 1300-*n* may be connected to the main gateway 1500. The string gateways 1300-1 to 1300-*n* and the main gateway 1500 may be connected to each other according to a communication method such as Ethernet. In this case, the first string gateway 1300-1 may transmit the first module string data MSD1 to the second string gateway. Each of the string gateways except the first string gateway 1300-1 and the last string gateway 1300-*n* may transmit at least one module string data received from the previous string gateway and module string data received from a connected module string to the next string gateway. The last string gateway 1300-*n* may transmit module string data MSD1 to MSDn of module strings included in the photovoltaic system to the main gateway 1500.

On the other hand, according to the embodiment of FIG. 14, each of the string gateways 1300-1 to 1300-*n* may be directly connected to the main gateway 1500. For example, when the string gateways 1300-1 to 1300-*n* and the main gateway 1500 support a wireless communication method, each of the string gateways 1300-1 to 1300-*n* may be directly connected to the main gateway 1500 according to the wireless communication method. The main gateway 1500 may receive the module string data MSD1 to MSDn from the string gateways 1300-1 to 1300-*n*, respectively.

With continued reference to FIGS. 13 and 14, each of the string gateways 1300-1 to 1300-*n* may provide separated power to an inverter 1400. The inverter 1400 may convert the received power into AC power and provide the AC power to a grid or the like. In addition, the inverter 1400 may measure a module current of each of the module strings based on power provided from each of the module strings, and transmit data including the measured module current to the main gateway 1500. In this case, the inverter 1400 may correspond to the current measuring device 400a described above in FIG. 4 and the like.

However, according to an embodiment, each of the string gateways 1300-1 to 1300-n may include a current measuring device (ammeter, etc.). In this case, each of the string gateways 1300-1 to 1300-n may measure a module current based on power provided from the module string, and may transmit the measured module current and module string data to the main gateway 1500. In this case, the string gateways 1300-1 to 1300-n may correspond to the current measuring device 400a.

The main gateway 1500 may transmit the module group data MGD including the received module string data MSD1 to MSDn and a module current to the Cloud 500. The main gateway 1500 may be connected to the Cloud 500 according to an Ethernet communication method, but the disclosure is not limited thereto.

When the photovoltaic system is implemented as an industrial photovoltaic plant and installed in a place with a large area, a data transmission rate may decrease or transmission power may increase as a distance between solar cell modules and a gateway (or inverter) increases. According to the embodiments of FIGS. 14 and 15, the photovoltaic system includes the solar cell modules 10a and the string gateways 1300-1 to 1300-n connected between the main gateway 1500 and the inverter 1400, thereby improving a transmission rate of the module string data MSD1 to MSDn and enabling efficiency of transmission power.

According to the inventive concept, module currents of solar cell modules included in a module string are the same, and thus a current measuring device connected to the module string may measure the module current of each of the solar cell modules more efficiently only by measuring a current of the module string, and data including the module current may be managed more efficiently.

In addition, because each of the solar cell modules is implemented to measure only a module voltage and transmit the module voltage to a current measuring device such as an inverter or a gateway, the configuration of the solar cell module may be simplified and a data transmission load may be reduced.

In addition, a monitoring device according to an embodiment is implemented to be provided in the form of an exterior to a photovoltaic system, thereby improving operational efficiency and data transmission efficiency of an existing photovoltaic system.

In addition, each of solar cell modules of the photovoltaic system is provided with a plurality of DC/DC converters connected to solar cells in a cell string unit, thereby minimizing the reduction in the total amount of power generated by the solar cell modules due to the reduction in the amount of power generated by a specific solar cell.

In addition, the photovoltaic system includes string gateways respectively connected to module strings according to an embodiment, thereby minimizing data transmission rate degradation due to a distance between solar cell modules and an inverter (or gateway) and enabling efficient data transmission power.

While the disclosure has been particularly shown and described with reference to embodiments thereof, it will be understood that various changes in form and details may be made therein without departing from the spirit and scope of the following claims.

Descriptions of features or aspects within each embodiment should typically be considered as available for other similar features or aspects in other embodiments.

What is claimed is:

1. A photovoltaic system comprising:
a plurality of solar cell modules each including a plurality of solar cells, wherein the plurality of solar cell modules are divided into at least one module string, and solar cell modules included in a same module string are connected in series;
a plurality of monitoring devices, wherein each of the plurality of monitoring devices is configured to measure a module voltage of a corresponding solar cell module included in the plurality of solar cell modules; and
a current measuring device configured to measure only a module current, among the module current and the module voltage, of each of the plurality of solar cell modules based on module string data including the module voltage,
wherein the each of the plurality of monitoring devices is configured to:
receive a signal for each module string from the current measuring device, wherein the signal is configured to control transmission of the module string data, and
in response to the signal, transmit the module string data including a corresponding module voltage to the current measuring device,
wherein the current measuring device is configured to:
receive the module string data corresponding to the signal from the plurality of monitoring devices, and measure the module current of the plurality of solar cell modules included in the each module string by measuring a current of the each module string,
wherein the current measuring device is connected to the plurality of solar cell modules through a power line, and
wherein the current measuring device comprises an inverter circuit configured to convert power received from the at least one module string into alternating current (AC) power, and supply the AC power to an external source.

2. The photovoltaic system of claim 1, wherein the plurality of monitoring devices comprise:
a voltage measuring device configured to measure the module voltage of the corresponding solar cell module; and
a power line communication interface configured to transmit the module string data including the module voltages to the current measuring device or another monitoring device through a power line.

3. The photovoltaic system of claim 2, wherein the current measuring device comprises:
a communication device configured to receive, from the at least one module string, the module string data including at least one module data together with power provided from solar cell modules included in the at least one module string, and separates the received module string data and the power; and
an ammeter configured to measure a current of a corresponding module string based on the separated power.

4. The photovoltaic system of claim 2, wherein the current measuring device is configured to transmit the signal to the at least one module string,
wherein the plurality of monitoring devices, in response to the signal, are further configured to transmit the module string data to another monitoring device, and wherein the current measuring device is configured to receive, from the at least one module string, the module string data.

5. The photovoltaic system of claim 4, wherein the at least one module string includes a plurality of module strings,
wherein the current measuring device is configured to transmit the signal to each of the plurality of module strings simultaneously, and receive the module string data from the each of the plurality of module strings, and
wherein at least some of reception times of respective pieces of the module string data overlap.

6. The photovoltaic system of claim 4, wherein the at least one module string includes a plurality of module strings, and the current measuring device is configured to receive respective pieces of the module string data of the plurality of module strings at different times.

7. The photovoltaic system of claim 1, wherein the plurality of monitoring devices are included in a junction box of a corresponding solar cell module.

8. The photovoltaic system of claim 1, wherein the plurality of solar cell modules comprise at least one DC/DC converter included in a junction box and connected to a plurality of solar cells of at least one cell string, and
wherein the cell string includes at least some of solar cells continuously connected to each other from among the plurality of solar cells.

9. The photovoltaic system of claim 8, wherein the plurality of monitoring devices comprise the at least one DC/DC converter, and
wherein the at least one DC/DC converter comprises a power line communication interface configured to transmit converter data including a converted voltage to the current measuring device.

10. The photovoltaic system of claim 1, wherein the photovoltaic system further comprises:
at least one string gateway connected to the at least one module string; and
a main gateway connected to the at least one string gateway,
wherein the current measuring device is configured to measure a current of the at least one module string based on power received from the at least one string gateway, and
wherein the module current of the plurality of solar cell modules is a current measured for a corresponding module string.

11. The photovoltaic system of claim 10, wherein the at least one string gateway includes a plurality of string gateways,
wherein the plurality of string gateways are connected to each other in a cascade structure,
wherein the main gateway is connected to any one of the plurality of string gateways to receive module string data of each of a plurality of module strings, and
wherein the module string data includes a module voltage of at least one solar cell module included in a corresponding module.

12. A monitoring device for a photovoltaic system, the monitoring device comprising:
a voltage measuring device connected to two solar cells of each end of a plurality of series-connected solar cells included in a solar cell module, and configured to measure a module voltage of the solar cell module, in response to a signal for each module string including a plurality of solar cell modules; and
a communication interface configured to receive the signal for the each module string from a current measuring device, and, in response to the signal, transmit module string data including the measured module voltage to the current measuring device;
wherein the current measuring device comprises an inverter circuit which is configured to convert power received from at least one module string into alternating current (AC) power, and supply the AC power to an external source, and
wherein the current measuring device is configured to measure only a module current, among the module current and the module voltage, of the plurality of solar cell modules based on the module string data including the measured module voltage.

13. The monitoring device of claim 12, wherein the communication interface comprises:
a power line communication interface connected to a power line between the solar cell module and the current measuring device, and configured to transmit the module string data to the current measuring device or another monitoring device through power line communication.

14. The monitoring device of claim 12, wherein the monitoring device is included in a junction box of the solar cell module.

15. The monitoring device of claim 12, wherein the communication interface is further configured to:
receive the signal transmitted from the current measuring device, and
transmit the module string data to another monitoring device in response to the signal.

* * * * *